(12) United States Patent
Dunker

(10) Patent No.: US 8,414,083 B2
(45) Date of Patent: Apr. 9, 2013

(54) TAILGATE

(75) Inventor: Larry Dunker, Mankato, MN (US)

(73) Assignee: Crysteel Manufacturing, Inc., Lake Crystal, MN (US)

( * ) Notice: Subject to any disclaimer, the term of this patent is extended or adjusted under 35 U.S.C. 154(b) by 0 days.

(21) Appl. No.: 13/012,687

(22) Filed: Jan. 24, 2011

(65) Prior Publication Data

US 2011/0233953 A1 Sep. 29, 2011

Related U.S. Application Data

(60) Provisional application No. 61/311,729, filed on Mar. 8, 2010.

(51) Int. Cl.
*B60P 1/00* (2006.01)
*B62D 25/08* (2006.01)

(52) U.S. Cl. .......................... 298/23 R; 296/56

(58) Field of Classification Search ............... 298/23 R, 298/23 M, 23 S, 23 A, 17 R; 296/57.1, 59, 296/146.8, 50, 53, 146.1, 146.5, 146.11, 296/106, 191, 56, 193.06
See application file for complete search history.

(56) References Cited

U.S. PATENT DOCUMENTS

| | | | | |
|---|---|---|---|---|
| 2,246,358 | A | 6/1941 | Jelinek | 16/163 |
| 3,026,139 | A | 3/1962 | Ackerman | 296/56 |
| 3,272,552 | A * | 9/1966 | Park | 296/56 |
| 3,869,168 | A | 3/1975 | Matheson | 296/56 |
| 4,109,963 | A * | 8/1978 | Sieving et al. | 298/23 M |
| 4,307,541 | A * | 12/1981 | Farmer et al. | 49/280 |
| 4,989,918 | A | 2/1991 | Biddy | 298/23 |
| 5,006,030 | A * | 4/1991 | Smith et al. | 414/406 |
| 5,527,098 | A * | 6/1996 | McKinney et al. | 298/23 MD |
| 5,816,766 | A * | 10/1998 | Clark | 414/517 |
| 6,499,808 | B2 | 12/2002 | Palmberg | 298/23 |
| 6,764,130 | B1 | 7/2004 | Hull | 296/186.4 |
| 7,240,968 | B2 | 7/2007 | Brown | 298/23 |
| 7,350,873 | B2 * | 4/2008 | Bibeau | 298/23 M |

* cited by examiner

*Primary Examiner* — Glenn Dayoan
*Assistant Examiner* — Sunsurraye Westbrook
(74) *Attorney, Agent, or Firm* — Matthew A. Pequignot; Pequignot + Myers LLC

(57) ABSTRACT

Improved tailgates useful, for example, with dump beds or bodies of trucks. In certain example embodiments, tailgates capable of operating in multiple modes. In preferred (but not all) embodiments, tailgates capable of being selectively operated in metering, high lift, and non-lifted, pivot modes.

7 Claims, 27 Drawing Sheets

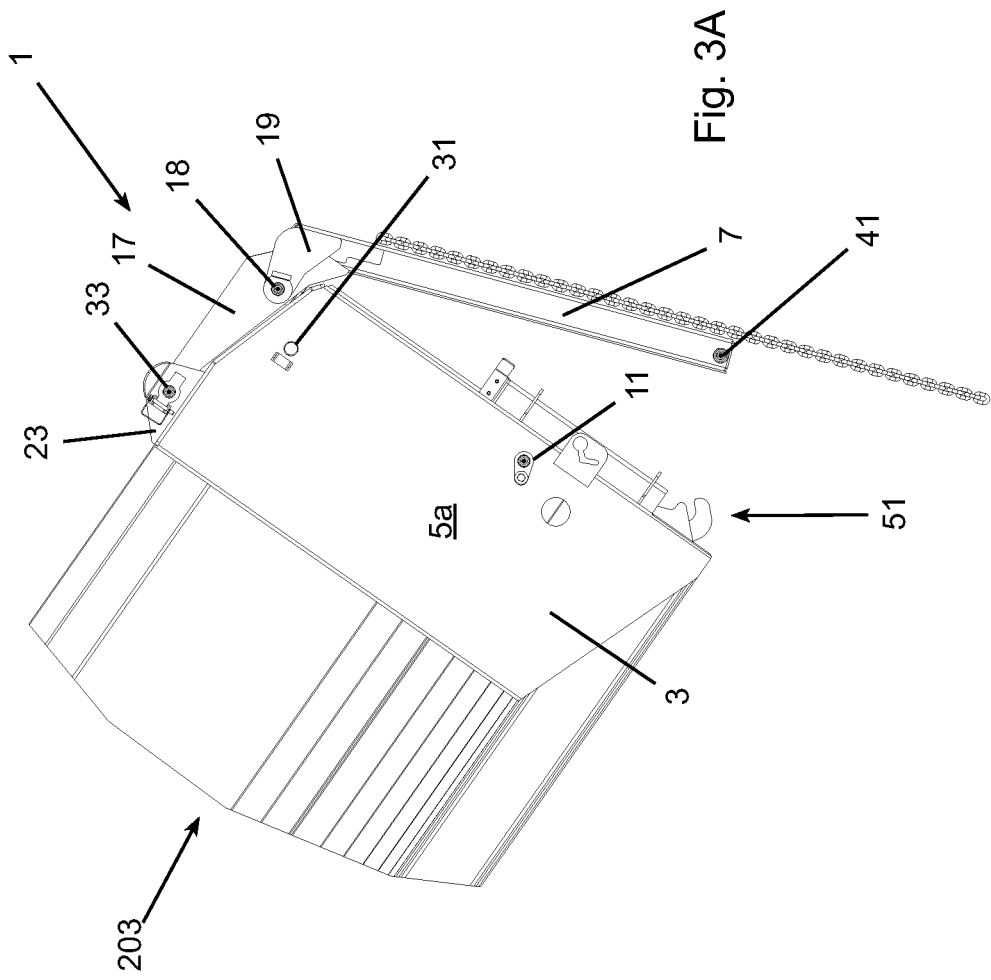

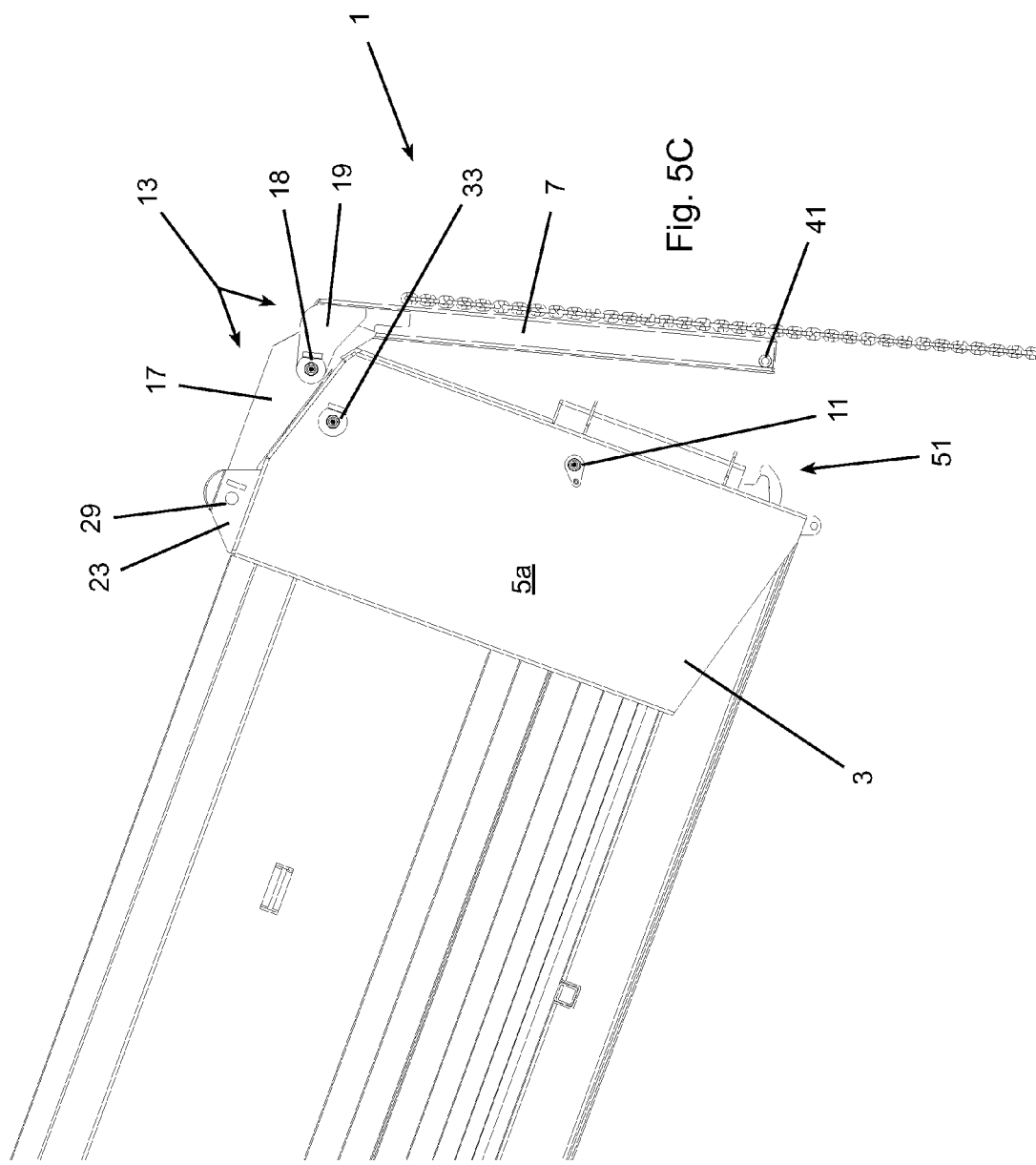

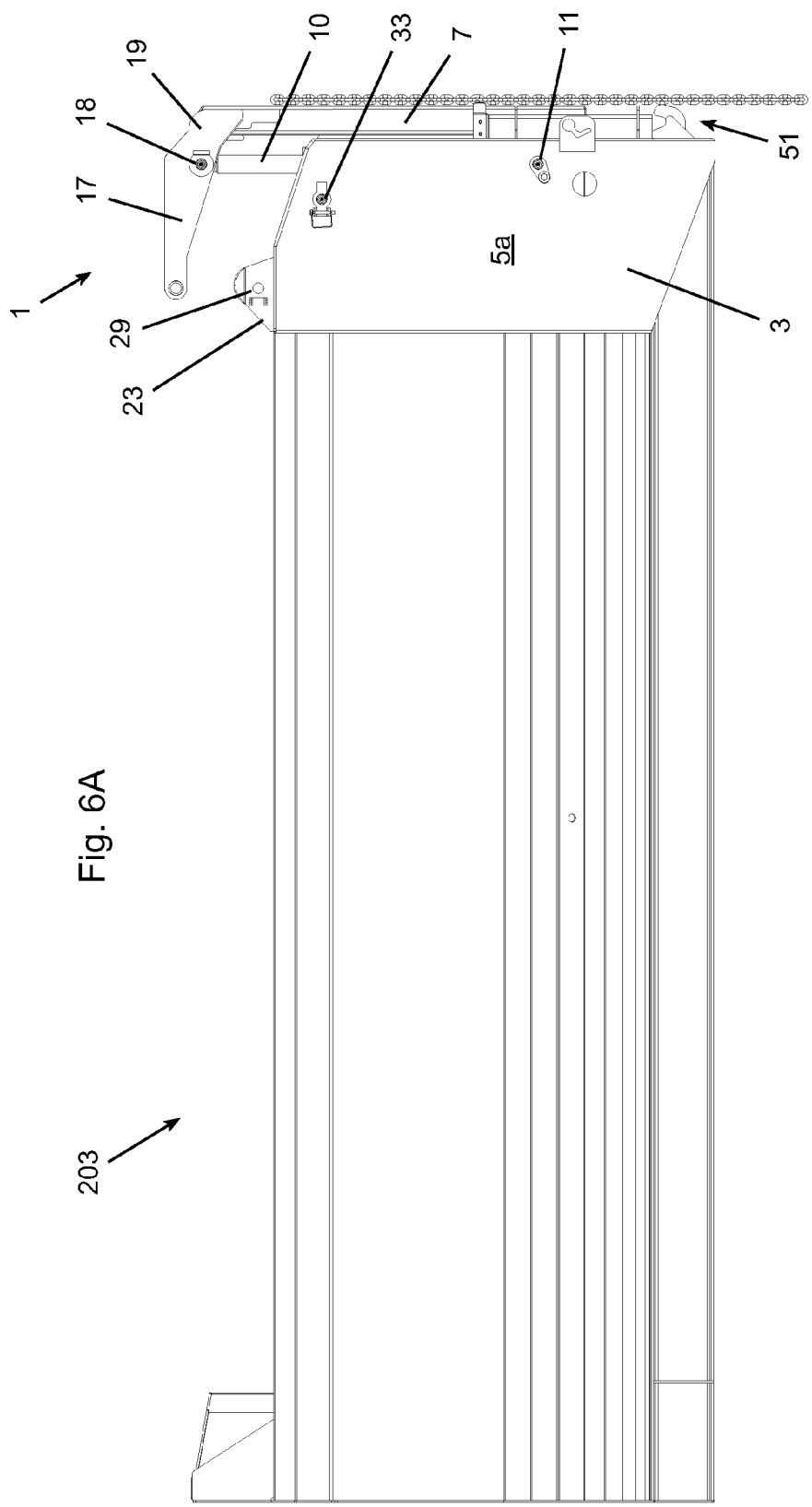

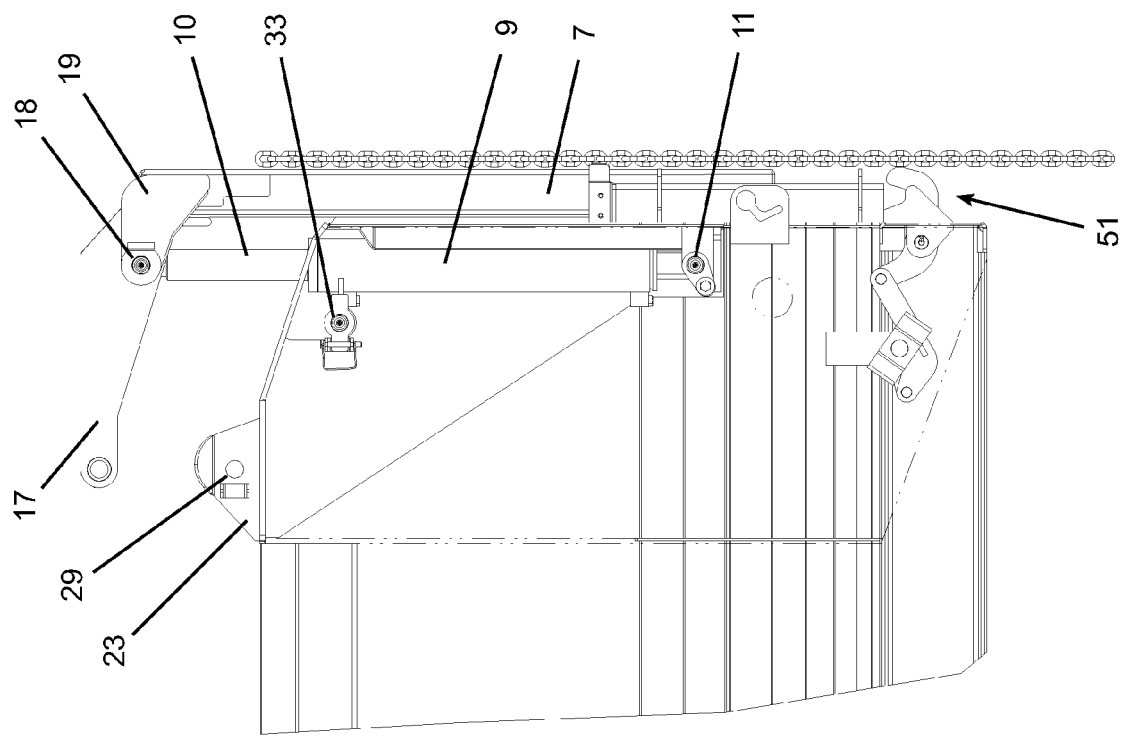

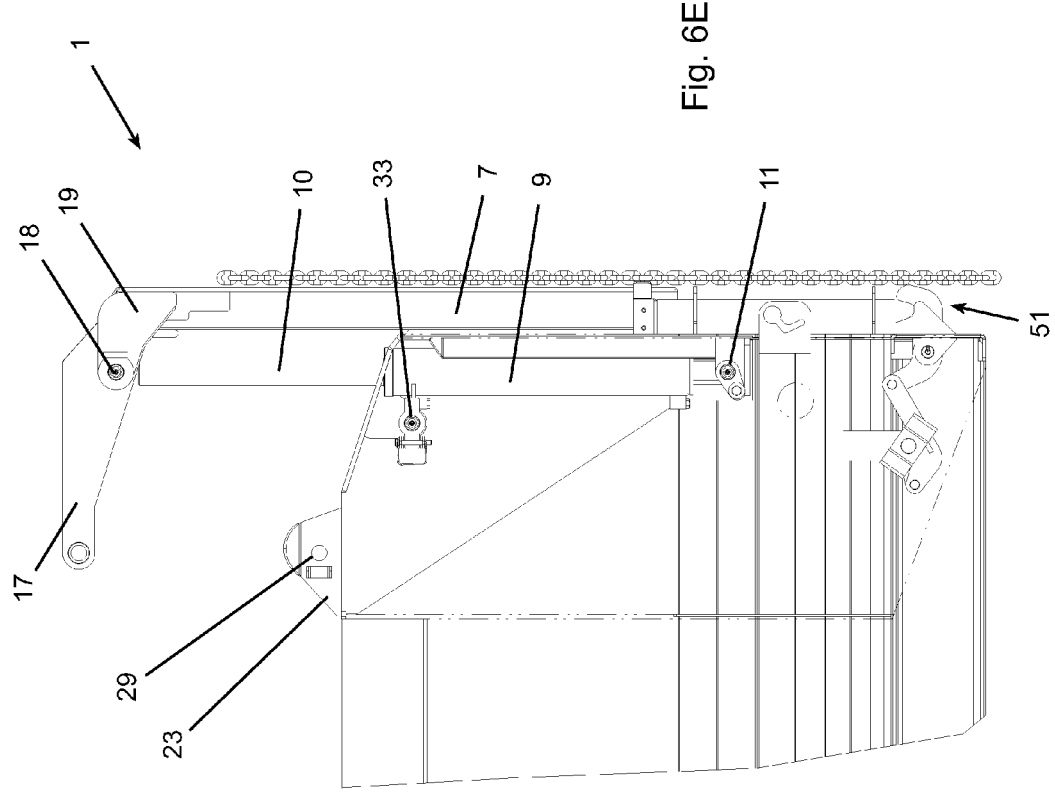

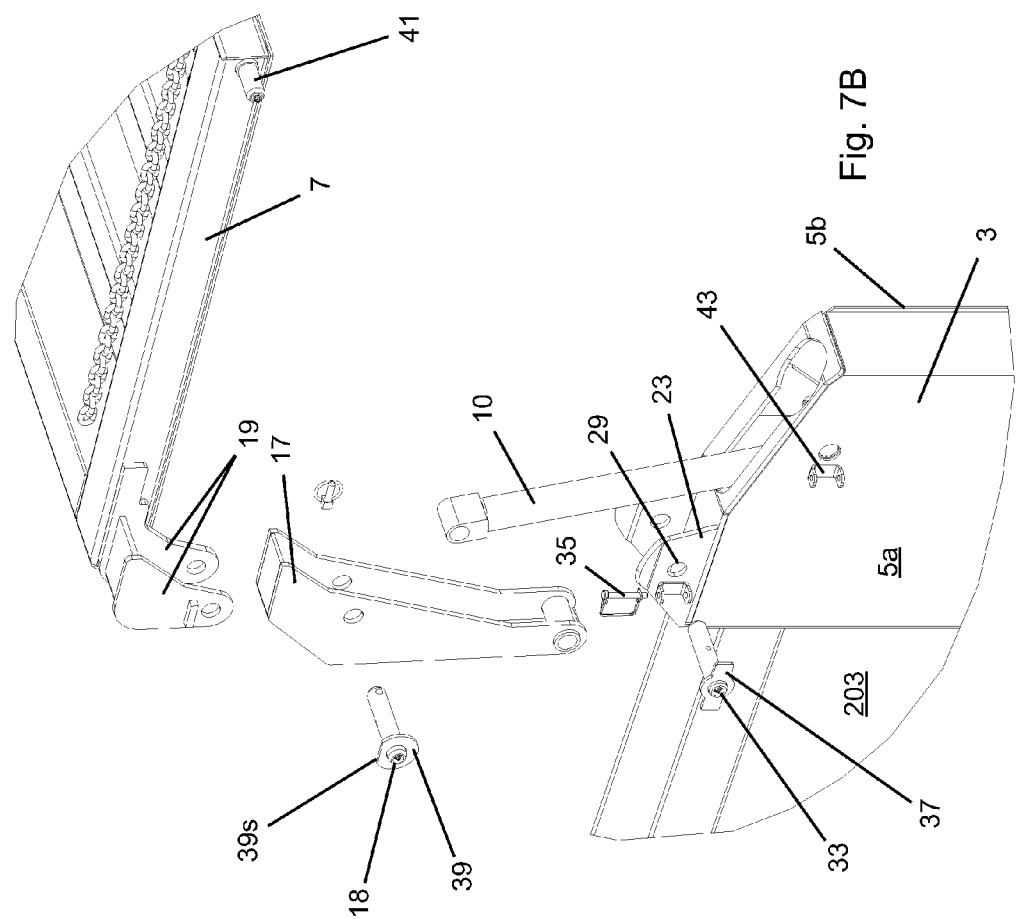

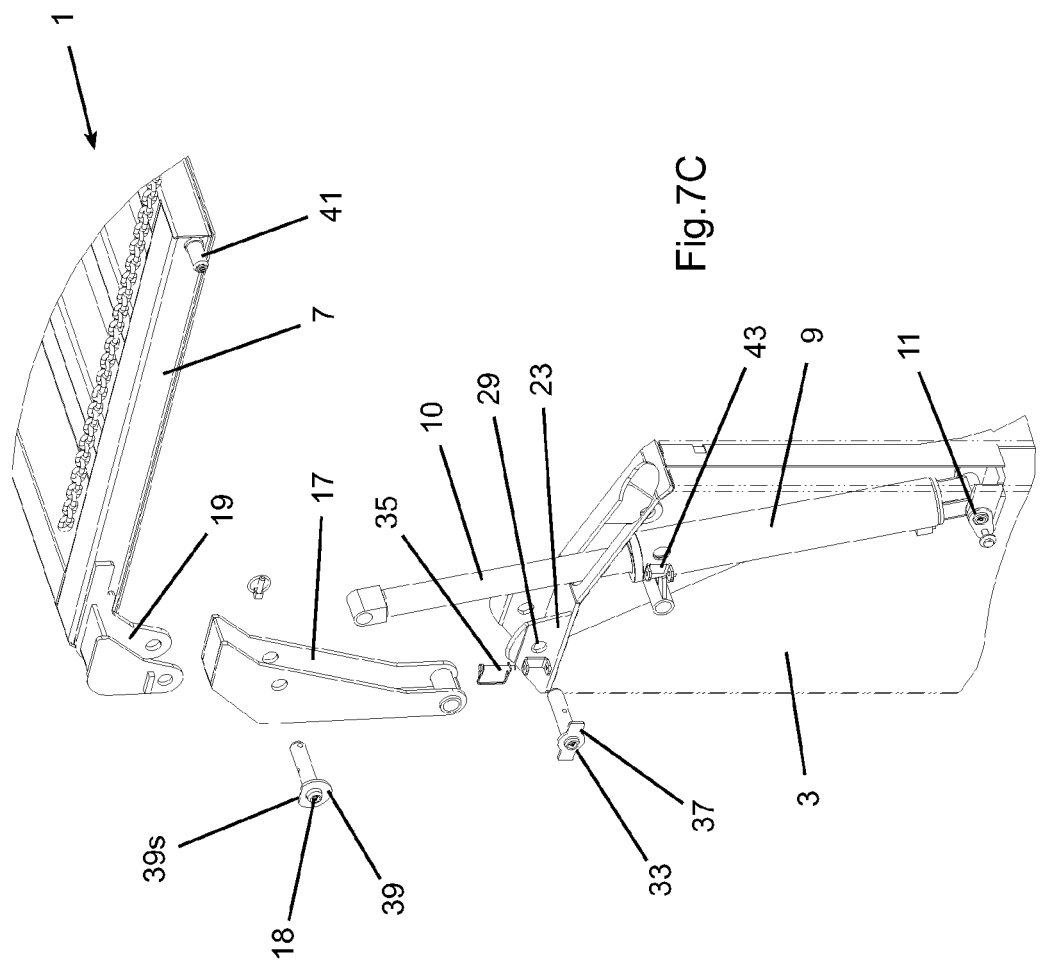

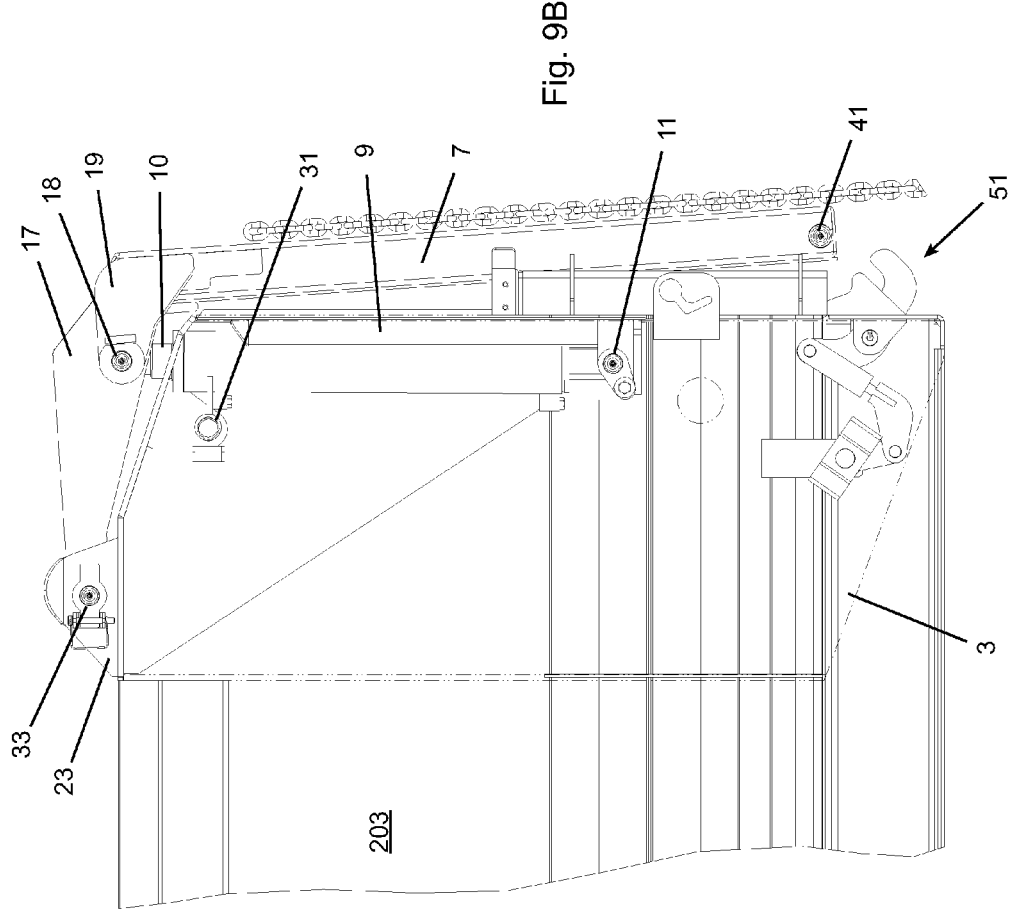

TAILGATE

RELATED APPLICATION DATA

This application claims priority of U.S. Provisional Patent Application No. 61/311,729, filed Mar. 8, 2010, entitled TAILGATE, the entirety of which is hereby incorporated by reference.

FIELD OF THE INVENTION

This invention relates to improved tailgates useful, for example, with dump bodies of trucks. In certain example embodiments, this invention relates to tailgates capable of operating in multiple modes. In preferred (but not all) embodiments, this invention relates to tailgates capable of selectively operating in metering, high lift, and non-lifted, pivot modes.

BACKGROUND OF THE INVENTION

In order to facilitate the utility of unloading and loading of truck beds or bodies, tailgates have become ubiquitous in the art for their numerous advantages over a fixed rear bed or body wall (the terms truck bed and truck body being used interchangeably through this specification, for the purposes of describing various non-limiting embodiments of the subject invention). In this regard, a typical tailgate acts as a substitute for the rear bed or body wall and may be pivoted open (or raised vertically without pivoting) so as to facilitate entry and egress into the carrying or storage portions of a truck bed or body as well as to facilitate unloading of material from such a bed or body when employed on a dump truck, for example (which can typically be raised or tilted so that material being transported exits the rear of the truck body via gravity).

At least three different tailgate types have become commonplace in the art. For example, the tailgate illustrated and described in U.S. Pat. No. 4,989,918 (FIG. 4) is a so-called metering type which can be lifted vertically to various heights, without pivoting, so that the exit rate of material being dumped from a vehicle can be controlled via the size of the opening at the rearward most portion of the dump bed created by the vertical height of the tailgate (e.g., the higher the tailgate is vertically raised, without pivoting, the larger the opening created and the faster the dump rate). In U.S. Pat. No. 3,869,168 (FIG. 1), a high lift-type tailgate is described which is a modification of a conventional pivot-type tailgate illustrated in U.S. Pat. No. 2,246,358. A high-lift tailgate is an improvement over a conventional pivot-type tailgate in the sense that, if a truck is carrying or transporting large debris, for example, a relatively large opening at the rear of the vehicle bed or body can be obtained (so that the material can be "dumped" free of obstruction by the tailgate) by simultaneously raising the tailgate vertically and pivoting it out of the exit path (e.g., with a hydraulic cylinder).

Although the above-described prior art tailgates often work well for their limited, intended purposes, such designs, known prior to the herein described invention, have one or more inefficiencies and/or drawbacks (or problems) associated with their use. In view of such inefficiencies and/or drawbacks and/or problems, it is apparent that there exists a need in the art for a tailgate which addresses, overcomes, mitigates, and/or solves one or more of such problems and/or drawbacks and/or inefficiencies in the art. It is a purpose of this invention to fulfill this and/or other needs in the art which will become more apparent to the skilled artisan once given the following disclosure.

SUMMARY OF THE INVENTION

Generally speaking, this invention addresses the above-described needs in the art by providing a tailgate and/or unique parts thereof which offers improved and/or additional functionality relative to prior art tailgates (or tailgate assemblies or parts). For example, one non-limiting embodiment of a tailgate provided is structurally configured such that it can be selectively used in three different modes, as desired (e.g., based on materials being transported in a truck body). Such an example embodiment is particularly useful in that one truck (employing such a novel tailgate) can be used for carrying multiple types of loads or loads containing combinations of material types, and the functionality or mode of the tailgate can be changed by the vehicle operator, to accommodate such differing load types. For example, a truck employing such a tailgate could be used to transport sand which could then be dumped using the tailgate in a metering type (or slider type—such terms being used interchangeably herein) mode whereby the volume of sand being dumped (per unit of time) can be controlled by varying the vertical lift height of the tailgate. Afterwards, the same truck employing the same tailgate can be used to carry tree branches or boulders and the like. When transporting such large, bulky load types, in order to dump them, the vehicle operator need only switch the tailgate to a high lift mode, for example.

In certain embodiments, a tailgate is provided which is structurally configured to allow the tailgate to be operated in 1) non-lift, top hinge; 2) metering; and 3) high lift modes. A top hinged tailgate is typically useful for dumping free-flowing materials such as sand and gravel. A metering tailgate is typically useful for controlling the flow of material from a dump body. Control of flow may be important for various reasons including if such material is being fed into a spreader, such as a salt or aggregate spreader or for distributing materials in an even thickness over a large area, for example. A high lift tailgate is typically useful when large or heavy items, such as broken concrete, rip rap, tree branches, and the like are being dumped. A high lift tailgate can be raised by the use of air or hydraulic cylinders to a horizontal position before the body is raised. When the body is raised, large or heavy items may exit out of the body without striking the tailgate (or at least with less obstruction than a conventional tailgate). This facilitates speedy dump operation as well as can prevent damage to the tailgate.

In at least one embodiment, a tailgate is provided which can be switched, alternately, between top pivot (or top hinge) and metering modes using only controls in the cab of the truck (e.g., when a pin set is positioned or located in a first position and/or location). In one such example embodiment, changing the position and/or location of a set of pins on the tailgate assembly (e.g., to a second position and/or location) changes the tailgate to a configuration which can be switched, alternately, between a different set of modes (e.g., using only controls in the cab of a truck). In one of such embodiments, a tailgate can be changed (e.g., simply by moving and/or re-orienting a pin set) from a setup user switchable between top pivot (or top hinge) and metering modes to a setup user switchable between top pivot (or top hinge) and high lift modes (e.g., switchable using only controls in the cab of the truck).

In at least one embodiment of the invention, a hydraulic or pneumatic cylinder is employed which is pivotally attached to the truck body or tailgate assembly at a fixed location at one end and is connected to a moveable lever arm at a second end. In such embodiment, the body of the hydraulic or pneumatic cylinder can be secured in position (e.g., in a fixed angular position, such as in a vertical orientation) using a pin or pins inserted through an aperture in the truck body and/or in the tailgate assembly. Moreover, the hydraulic or pneumatic cylinder can be permitted to rotate about its bottom pivot attachment (e.g., when the tailgate is in operation modes, such as a high lift mode) by removal or re-orientation of such pins.

In at least one embodiment of the invention, a tailgate is provided which employs a hydraulic or pneumatic cylinder for selectively lifting or pivoting the tailgate in metering and/or high lift modes. In at least some of such embodiments, a latch assembly is provided and employed for allowing or prohibiting pivoting of the tailgate about a top pivot (e.g., by capturing or releasing a pin or pins located near the bottom of such a tailgate). Such a latch assembly may be manually operated or may be controlled via electronic, pneumatic, or hydraulic mechanisms or any combination thereof (either by using controls located inside or outside of the truck cab). In at least one embodiment, a hydraulic or pneumatic cylinder is employed which is pivotally attached to the truck body or tailgate assembly at a fixed location at one end and is connected to a moveable lever arm at a second end. In one of such embodiments, the body of the hydraulic or pneumatic cylinder can be secured in position (e.g., in a fixed angular position, such as in a vertical orientation) using a pin or pins inserted through an aperture in the truck body and/or in the tailgate assembly. In the same or other embodiments, the hydraulic or pneumatic cylinder can be permitted to rotate about its bottom pivot attachment (e.g., when the tailgate is in operation modes, such as a high lift mode) by removal or re-orientation of such pins.

In at least one non-limiting embodiment, a tailgate assembly is provided comprising: a pair of spaced apart side walls; an end wall comprising a gate; at least one extendible and retractable actuator pivotally connected at a first end to one of the spaced apart side walls; a lever arm having a first elongated arm portion including a terminal end and the lever arm having a second arm bracket portion pivotally connected to the first elongated arm portion via a pivot which simultaneously connects the extendible and retractable actuator to the lever arm; the gate being connected to and extending downwardly from the second arm bracket portion; at least first and second apertures located in one of the spaced apart side walls, the first and second apertures being located in particular positions such that: a) when a selector pin is inserted in the first aperture, the extendible and retractable actuator is secured in a substantially or completely vertical orientation during extension and retraction of the cylinder; and b) when the selector pin is inserted in the second aperture, the selector pin connects the terminal end of the lever arm to, or proximal to, one of the spaced apart side walls such that when the extendible and retractable actuator is extended, the lever arm pivots about an axis of the selector pin and the extendible and retractable actuator pivots about its first end within a range of angles.

In at least one embodiment, the horizontal distance between the terminal end of the lever arm and the connection of the lever arm to the second end of the extendible and retractable cylinder, when the tailgate is in a non-open position, is approximately 15.250 inches (other dimensions may, of course, be selected). In the same or other non-limiting embodiments, an example but effective vertical spacing distance between the terminal end of the lever arm and the connection of the lever arm to the second end of the extendible and retractable cylinder, when the tailgate is in a non-open position, is approximately 3.123 inches (other dimensions may, of course, be selected).

In at least one additional embodiment (or as part of one or more of the same embodiments described above), the tailgate assembly is structurally designed and configured so that, when in a high lift mode, the tailgate lifts away from the dump body soon after extension of the lift cylinder (extendible and retractable cylinder) begins (e.g., substantially immediately, in at least one embodiment). In such an embodiment, by lifting the tailgate quickly away from the dump body upon cylinder extension, "hang up" of the tail gate on portions of the dump body is reduced and/or prevented. In order to achieve such functionality, a particular configuration of lever arm may be used (such as shown in the accompanying drawings) as may be its orientation and position relative to its connection to the lift cylinder (extendible and retractable cylinder), and the position of the connection of the terminal end of the lever arm proximal to the dump body.

Certain specific examples of the invention are now described below with respect to certain non-limiting embodiments thereof as illustrated in the following drawings wherein:

BRIEF DESCRIPTION OF THE DRAWINGS

FIG. 3A is a two-dimensional profile view of the embodiment of the tailgate illustrated in FIG. 2A shown with the dump body in a elevated or dump position and a lower latch in an open position to release a "pin" on the lower portion of the tailgate.

FIG. 5C is a two-dimensional profile view of the embodiment of the tailgate illustrated in FIG. 5A shown with the dump body in a elevated or dump position and a lower latch in an open position to release a "pin" on the lower portion of the tailgate FIG. 6A is a two-dimensional profile view of the embodiment of the tailgate illustrated in FIG. 5A with the lift cylinder illustrated in a partially extended state.

FIG. 6B is a two-dimensional, x-ray view of the embodiment of the tailgate illustrated in FIG. 6B.

FIG. 6E is a two-dimensional, x-ray view of the embodiment of the tailgate illustrated in FIG. 6D.

FIG. 7B is a three-dimensional, blown-apart view of the embodiment of a tailgate illustrated in FIG. 7A.

FIG. 7C is a three-dimensional, x-ray view of the embodiment of a tailgate illustrated in FIG. 7B, with the cylinder and pin set shown in a high lift orientation.

FIG. 9B illustrates how the particular configuration of the lever arm depicted in FIG. 9A, and its orientation and position relative to its connection to the lift cylinder, and the position of the connection of the terminal end of the lever arm proximal to the dump body, in this non-limiting embodiment, is designed such that the tailgate begins to lift away from the dump body immediately upon extension of the cylinder.

DETAILED DESCRIPTION OF CERTAIN EXAMPLE EMBODIMENTS

For a more complete understanding of the present invention, reference is now made to the following description of various illustrative and non-limiting embodiments thereof, taken in conjunction with the accompanying drawings in which like reference numbers indicate like features.

Figure 1:
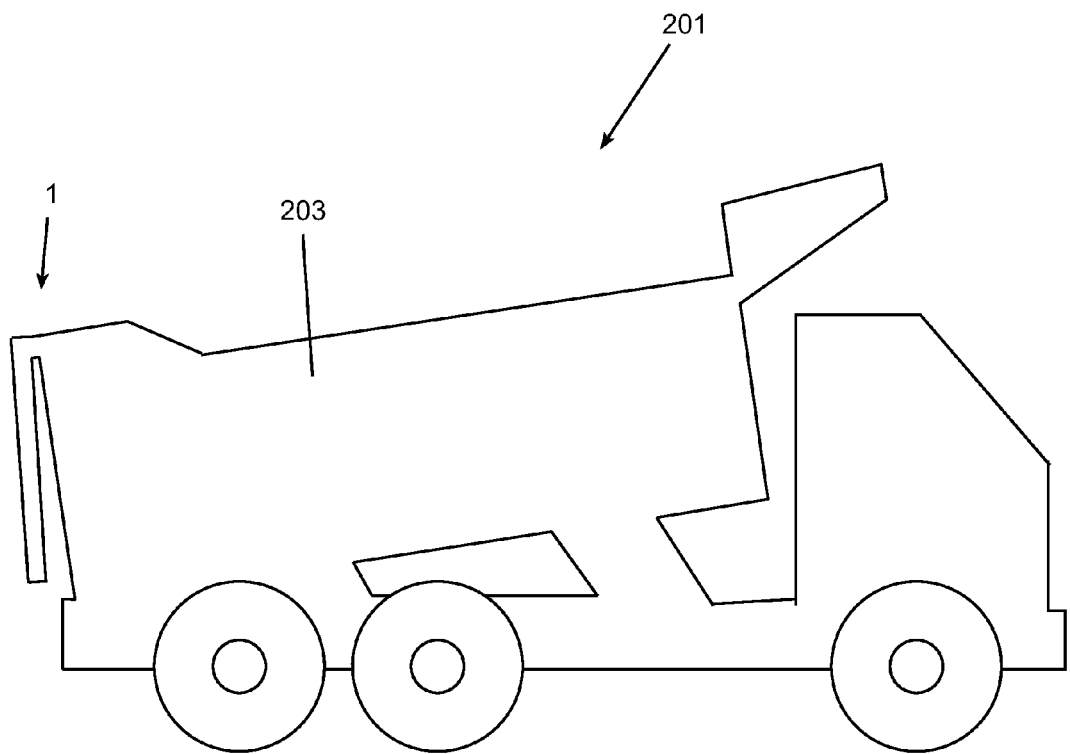
FIG. 1 is a profile view of a conventional dump truck which is one environment (out of many) in which the various embodiments of the invention described herein find utility.

Referring initially to FIG. 1, an example environment in which the present invention finds utility is illustrated therein. In this regard, FIG. 1 illustrates a conventional wheeled vehicle 201 having a pivoting dump body 203 installed thereon and an exemplar tailgate 1 installed on the dump body. Of course, tailgate 1 may be installed on other vehicle types or sizes and the vehicle depicted in FIG. 1 is not intended to be limiting with respect to the invention in any way.

Turning now to FIGS. 2A-9B, tailgate 1 is illustrated in more detail therein and is shown in various operational modes and setup configurations. The illustrated configuration of tailgate 1 is intended to be an example only and other configurations and variations of the illustrated tailgate are, of course, intended to be within the scope of the present invention.

In particular, tailgate 1 is generally comprised of an end wall or gate 7 which is selectively raised or lifted by operation of at least one extendible and retractable actuator (e.g., hydraulic cylinder) 9. Actuator or cylinder 9, in turn, is pivotally connected at its base or first end (via pivot 11) to a pillar 3 comprised of a pair of spaced apart side walls 5a and 5b. Of course, although it is not necessarily required, two lift cylinders 9 are preferably employed and connected to opposing pillar assemblies mounted on opposite sides of the truck body. Although such a configuration is what is illustrated in the subject drawings, only one side of the subject tailgate is described in detail herein for sake of simplicity. Regardless, as depicted in the drawings, the assemblies and parts described herein are simply duplicated on the other side of the truck body (but non-duplicate assemblies and parts could be employed without departing from the scope of the invention).

Turning now again to the particulars of the example tailgate illustrated, a lever arm 13 is interposed between gate 7 and cylinder 9 as the mechanism by which gate 7 is lifted or raised under cylinder (or actuator) power. More particularly, lever arm 13 is preferably (but not necessarily) comprised of two main lever components, forward arm 17 and rear arm (or bracket) 19 which are pivotally connected, one to the other, utilizing a conventional pivot pin-type connection (e.g., pin 18) as is well known in the art. Pin 18, in the illustrated embodiment, is also the mechanism by which cylinder 9 operatively connects to the lever arm.

It is noted that the particular configuration of lever arm which is employed in the illustrated example embodiment (which can be best seen in FIGS. 7A-7D) is selected to have a particularly desirable functionality. Specifically, in the example illustrated, forward and rears arms 17 and 19 have complementary configurations such that the rearward end of forward arm 17 nests (or substantially nests) within a "cradle" or matable portion of rear arm 19. Moreover, such as illustrated, the two lever arm portions preferably (but not necessarily) have one or more complementarily configured, angled planar arm surfaces (e.g., which nest against each other at rest and during certain phases of tailgate operation). Employing the disclosed lever arm configuration operably interconnected via pin 18, the two lever arm portions are able to pivot with respect to each other in one direction but not the other. In particular, this limited pivotability provides a desired functionality to the tailgate which is described in full detail herein below.

As aforesaid, cylinder 9 is connected at its one end to lever arm 13 via pivot pin 18 (in pivotable fashion). At its opposite end, cylinder 9 is pivotally connected to pillar 3 via an additional pivot pin or bolt 11. Of course, being a hydraulic cylinder (in this non-limiting example), cylinder 9 is also connected to a fluid source (not illustrated for sake of simplicity) which can be pressurized and de-pressurized in conventional fashion to extend and retract the extendible and retractable portion of cylinder 9 as desired. Although a hydraulic cylinder is pictured in the example configuration being discussed herein, it is, of course, contemplated that other lift type mechanisms may be employed whether they are pneumatic mechanisms (e.g., such as a pneumatic cylinder) or electrically operated lift mechanism such as a type of electrically operated mechanically extendible (and retractable) arm.

Figure 2A:
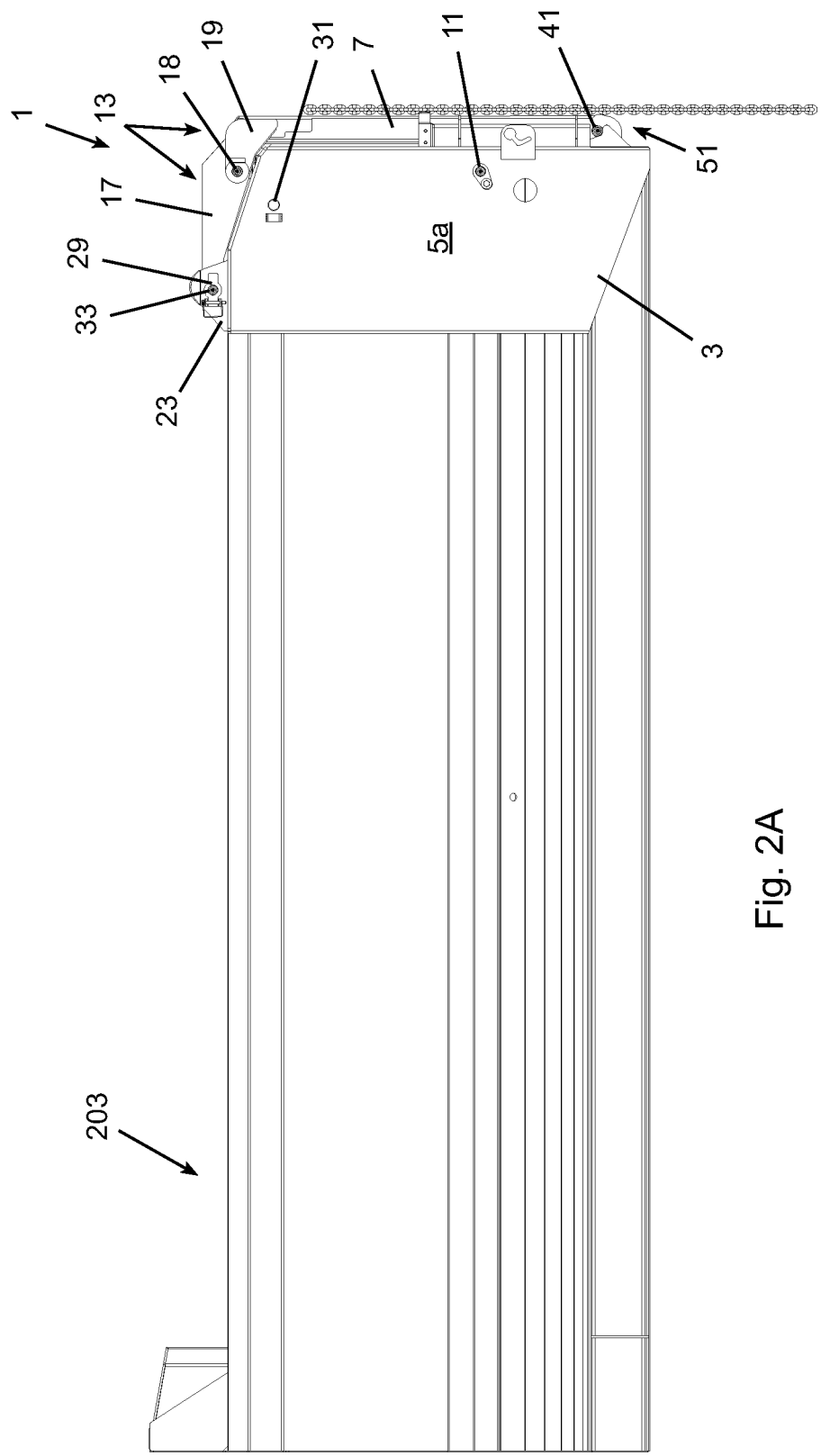
FIG. 2A is a two-dimensional, profile view of one example embodiment of a tailgate according to the subject invention installed on a dump body and shown with a pin set installed in a particular mode position and a lift cylinder in a non-extended state.
Figure 2B:
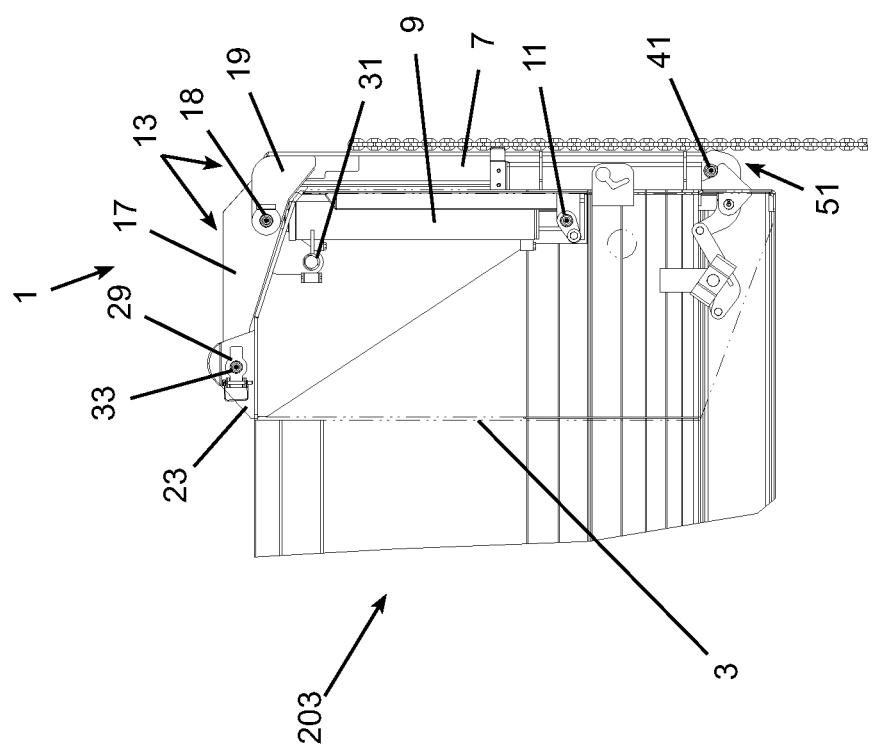
FIG. 2B is a profile, x-ray view of the embodiment of tailgate illustrated in FIG. 2A.
Figure 2C:
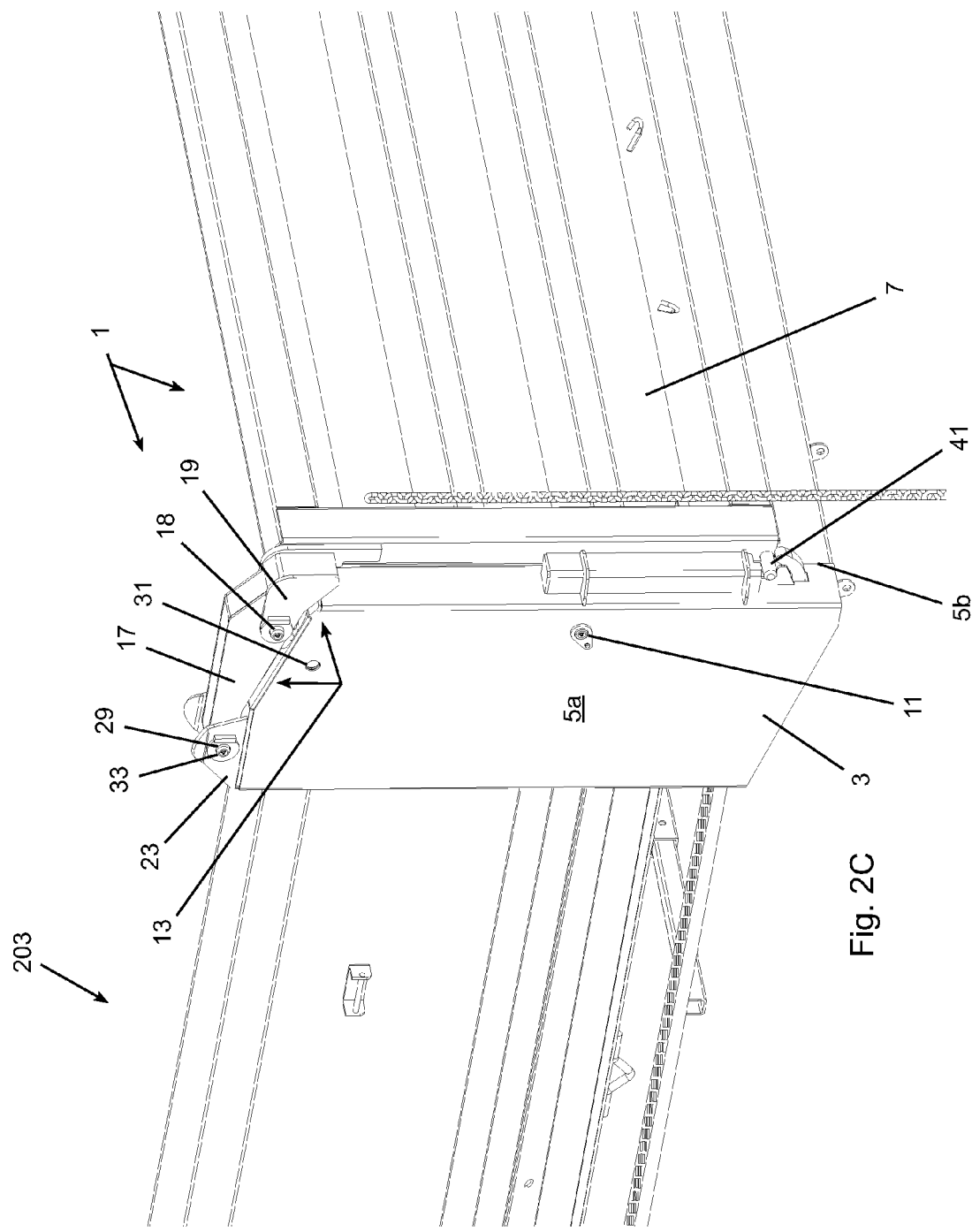
FIG. 2C is a three-dimensional view of the embodiment of the tailgate illustrated in FIG. 2A.
Figure 5A:
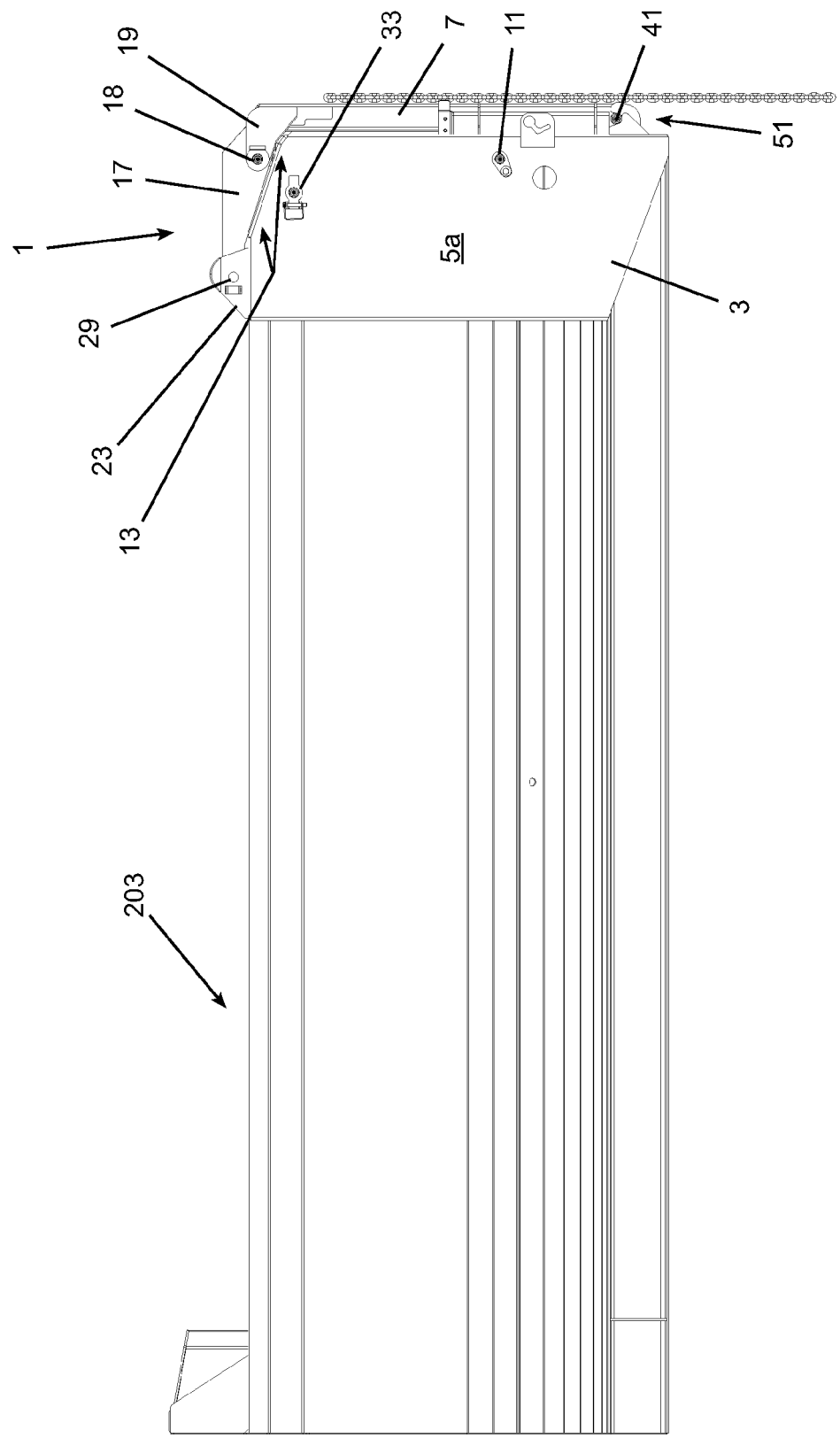
FIG. 5A is a two-dimensional, profile view of one example embodiment of a tailgate according to the subject invention installed on a dump body and shown with a pin set installed in a different particular mode position and a lift cylinder in a non-extended state.
Figure 5B:
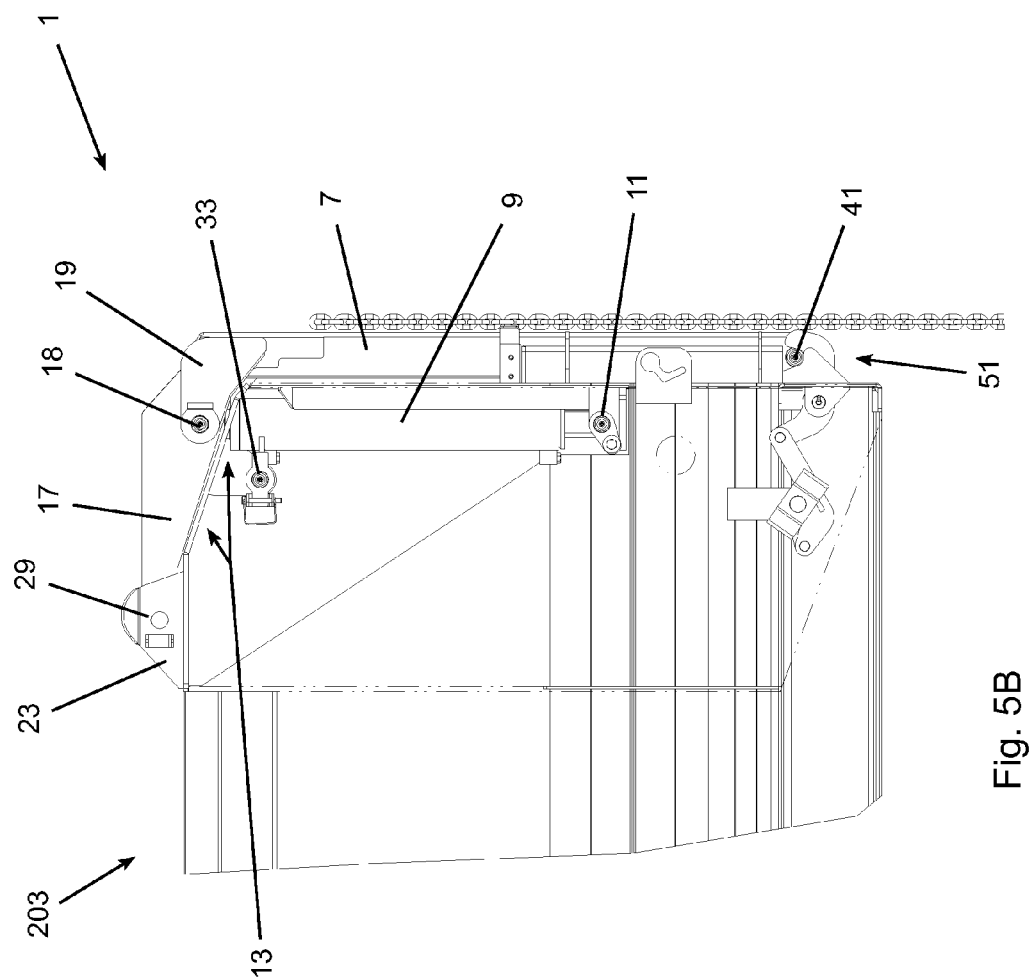
FIG. 5B is a profile, x-ray view of the embodiment of tailgate illustrated in FIG. 5A.
Figure 6C:
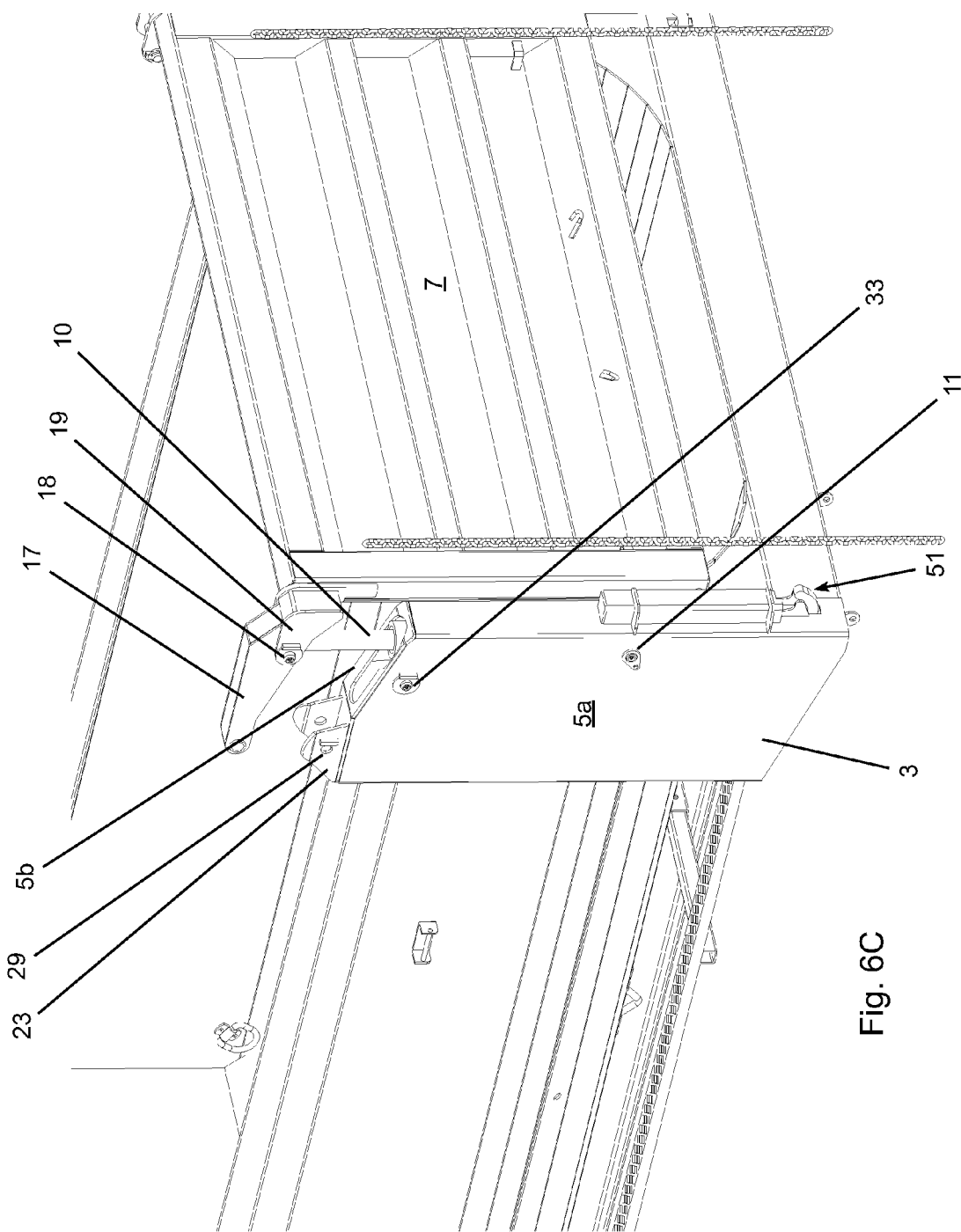
FIG. 6C is a three-dimensional view of the embodiment of the tailgate illustrated in FIG. 6B.
Figure 6D:
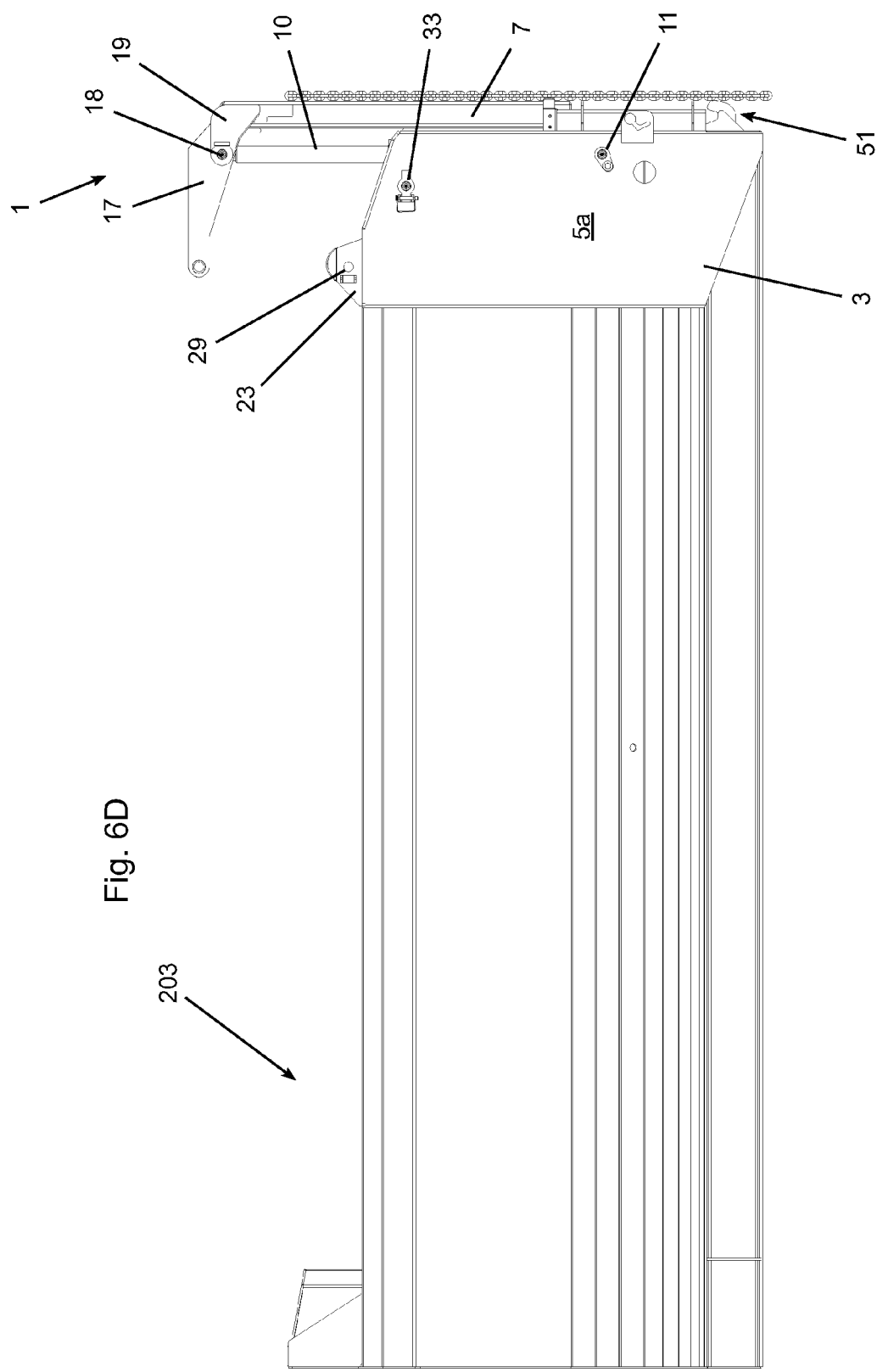
FIG. 6D is a two-dimensional, profile view of the embodiment of the tailgate illustrated in FIG. 6A with the lift cylinder illustrated in a further extended state.
Figure 6F:
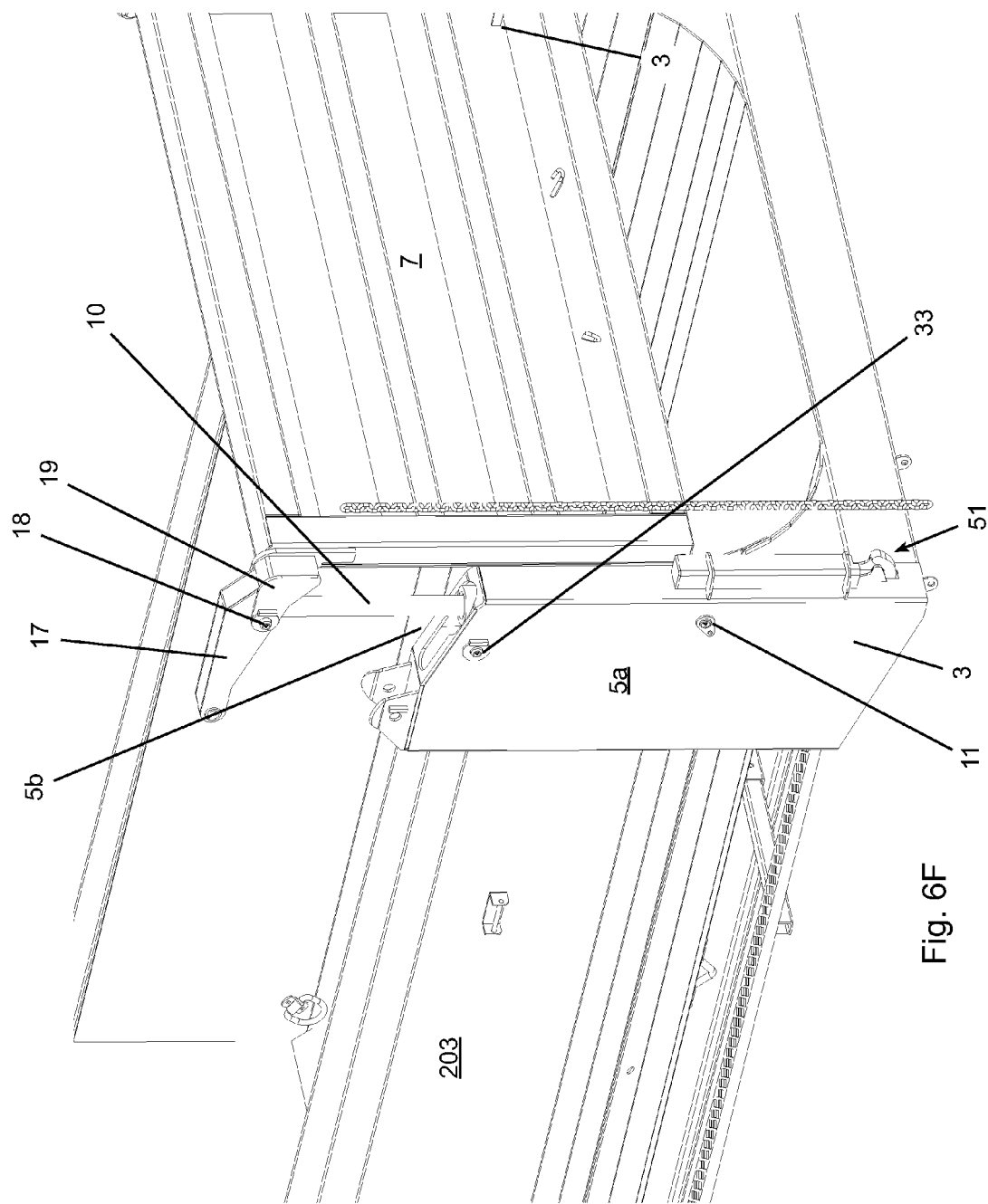
FIG. 6F is a three-dimensional view of the embodiment of the tailgate illustrated in FIG. 6E.
Figure 7A:
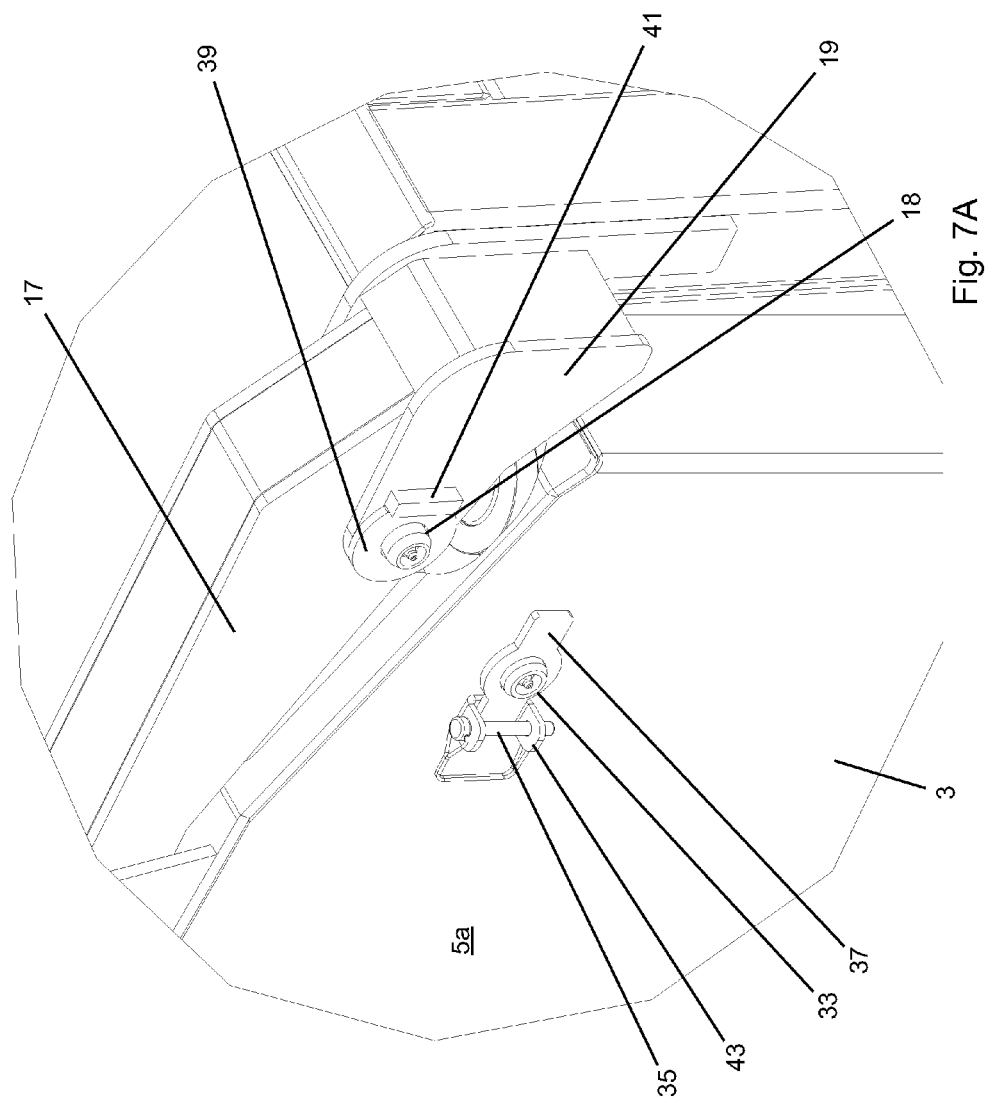
FIG. 7A is an alternative embodiment of a tailgate employing a different set than that illustrated in FIG. 2A.
Figure 7D:
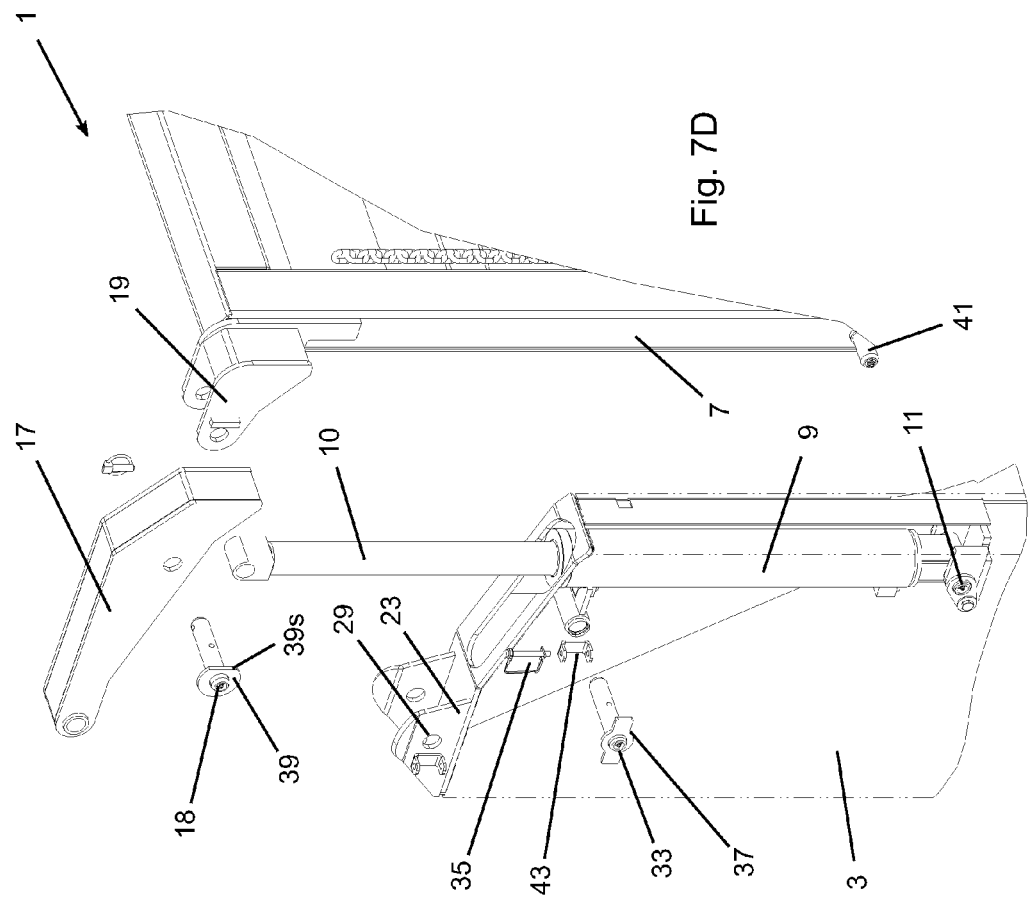
FIG. 7D is a three-dimensional, x-ray, blown apart view of the embodiment of a tailgate illustrated in FIG. 7A, with the cylinder and pin set shown in a metering or slider orientation.
Figure 8:
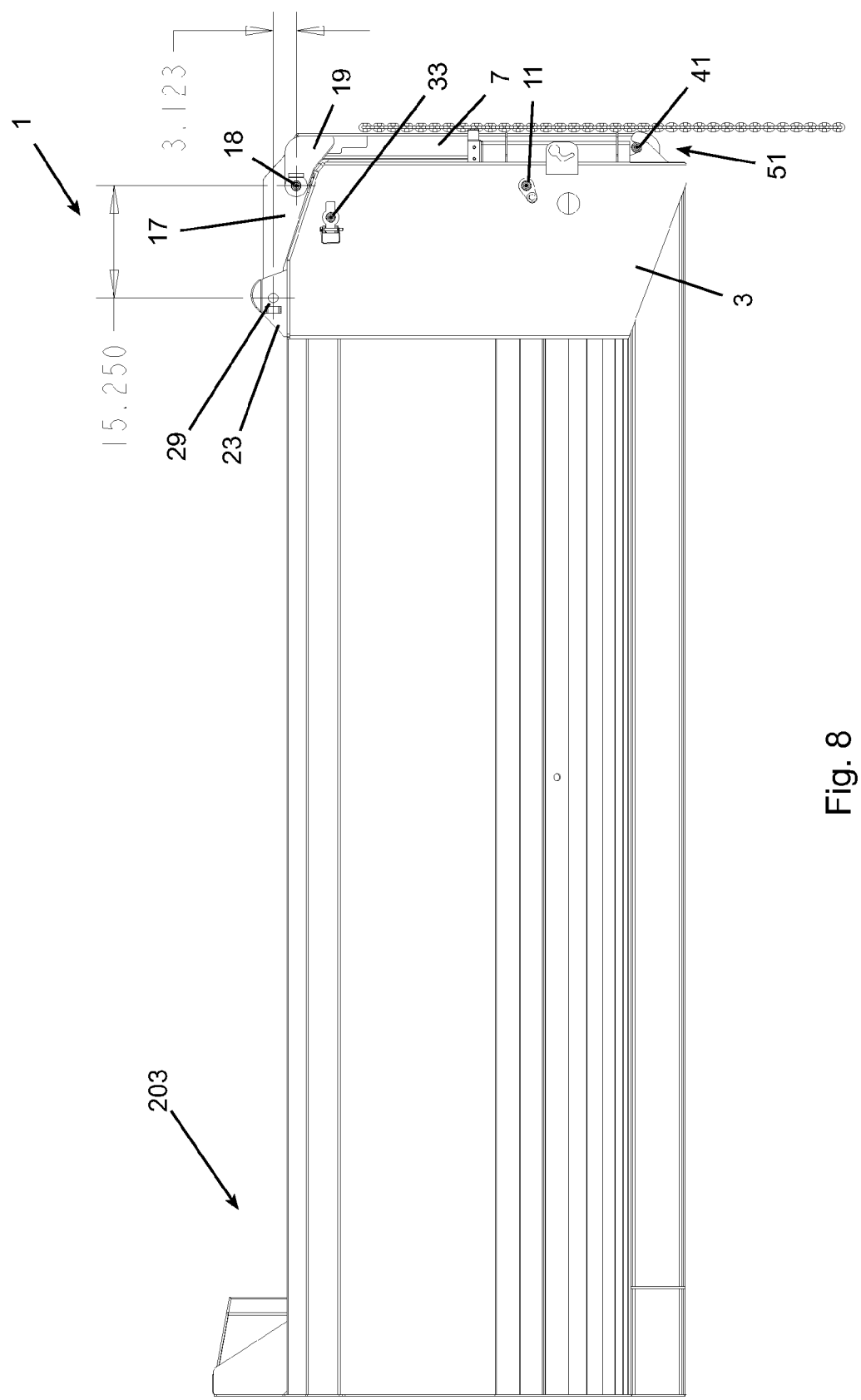
FIG. 8 illustrates a two-dimensional, profile view of an exemplar tailgate assemble with certain particularly advantageous part arrangements and dimensions (shown in inches).

As can be ascertained from the drawings, when cylinder 9 is pressurized and caused to extend, the extension of the rod portion 10 of the cylinder causes gate 7 to either lift in metering or sliding fashion or to raise in high lift mode as described elsewhere herein (the terms "lift" and/or "raise" not necessarily being intended to have any narrow limited meaning with respect to the operation of the tailgate as elsewhere used herein). In particular, whether gate 7 is lifted in a metering mode or raised in a high lift mode depends on the user selected install position of selector pin 33. In this regard, pillar 3 includes a bracket 23 with a corresponding first (or high lift) position aperture 29 and also includes a second (or metering position) aperture 31. Having such apertures, when the truck body is in a non-lifted (horizontal, at rest) position, the operational mode of tailgate 1 can be changed between metering (or slide lift) and high lift modes by selecting the install location of selector pin 33. Specifically, when selector pin 33 is installed in the first position within aperture 29 at bracket 23 such as shown in FIGS. 2A-2C, the forward most end of lever arm 13 is pivotally connected to bracket 23. Conversely, when selector pin 33 is installed in the second position within aperture 31, lever arm 13 is unconnected to bracket 23 but cylinder 9 is secured in a vertical or near vertical orientation such as shown in FIGS. 5A-5C. This is accomplished because in the second position, selector pin 33 physically obstructs cylinder 9 from pivotal movement in a forward tilt direction. Of course, cylinder 9 need not necessarily be oriented in a precise vertical orientation but may be in other orientations so long as such orientations still allow for operation in the modes described herein.

High Lift Operation

Figure 4A:
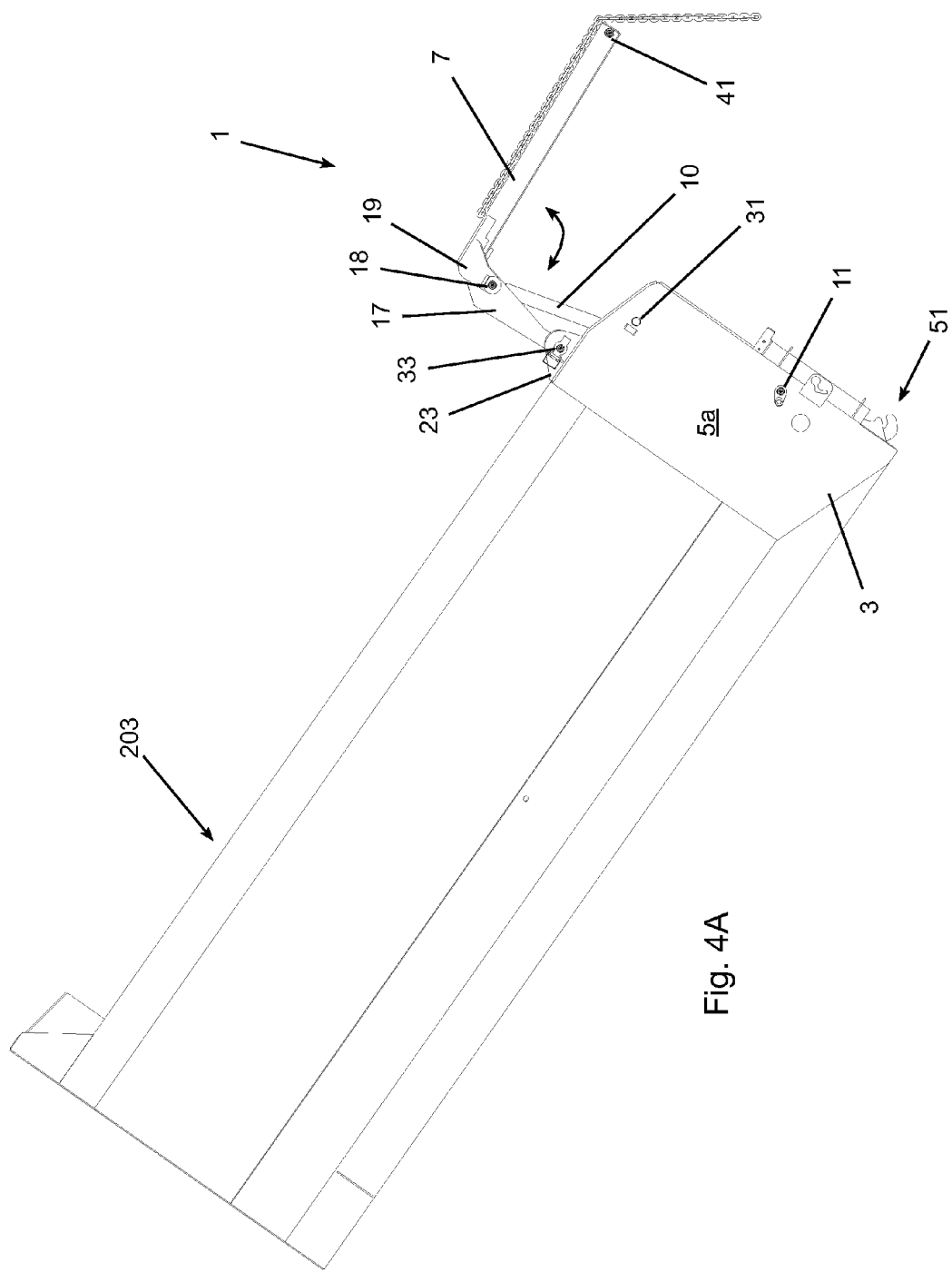
FIG. 4A is a two-dimensional, profile view of the tailgate illustrated in FIG. 3A with the lift cylinder shown in an extended state.
Figure 4B:
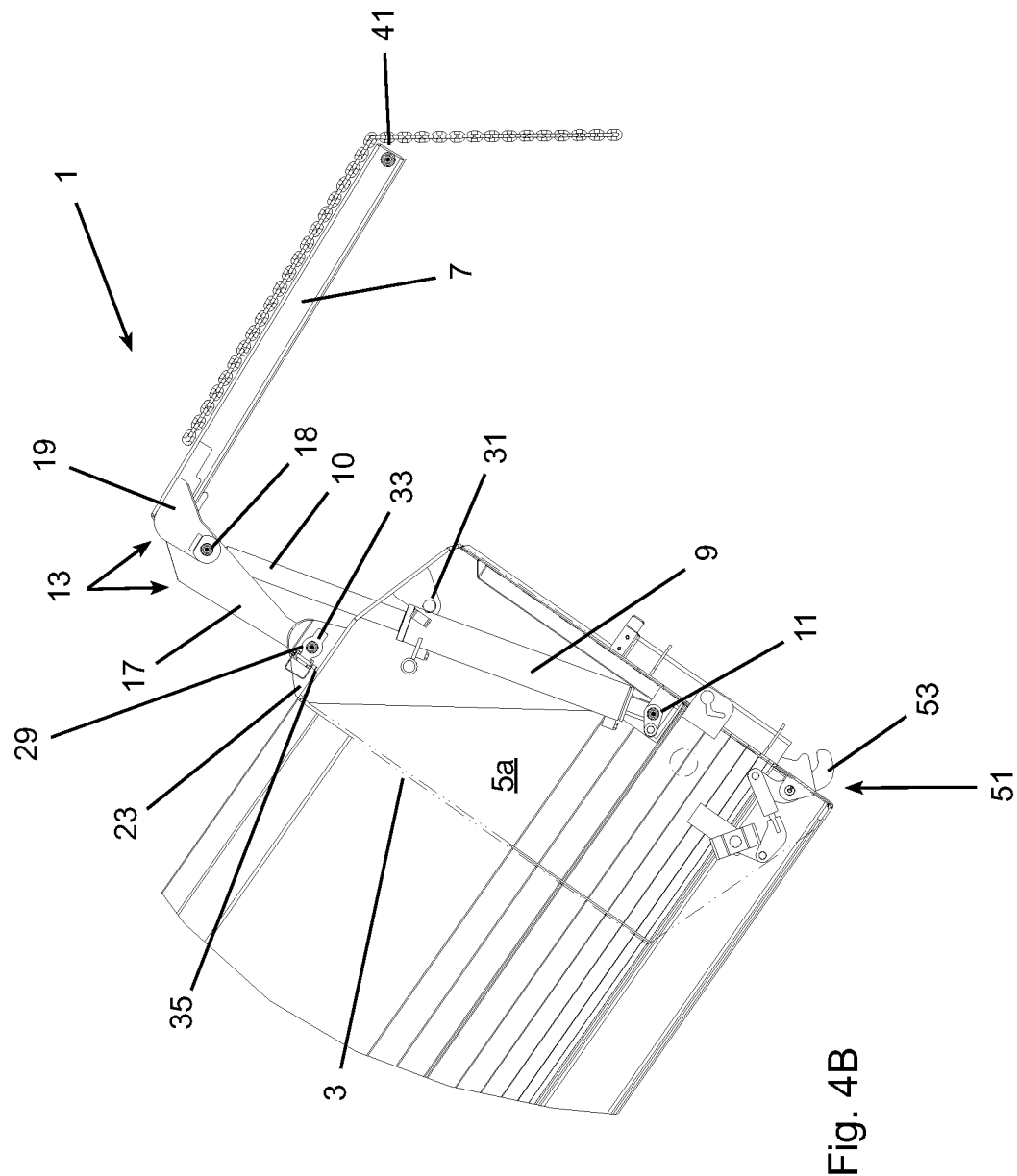
FIG. 4B is a two-dimensional, x-ray view of the tailgate illustrated in FIG. 4A.
Figure 4C:
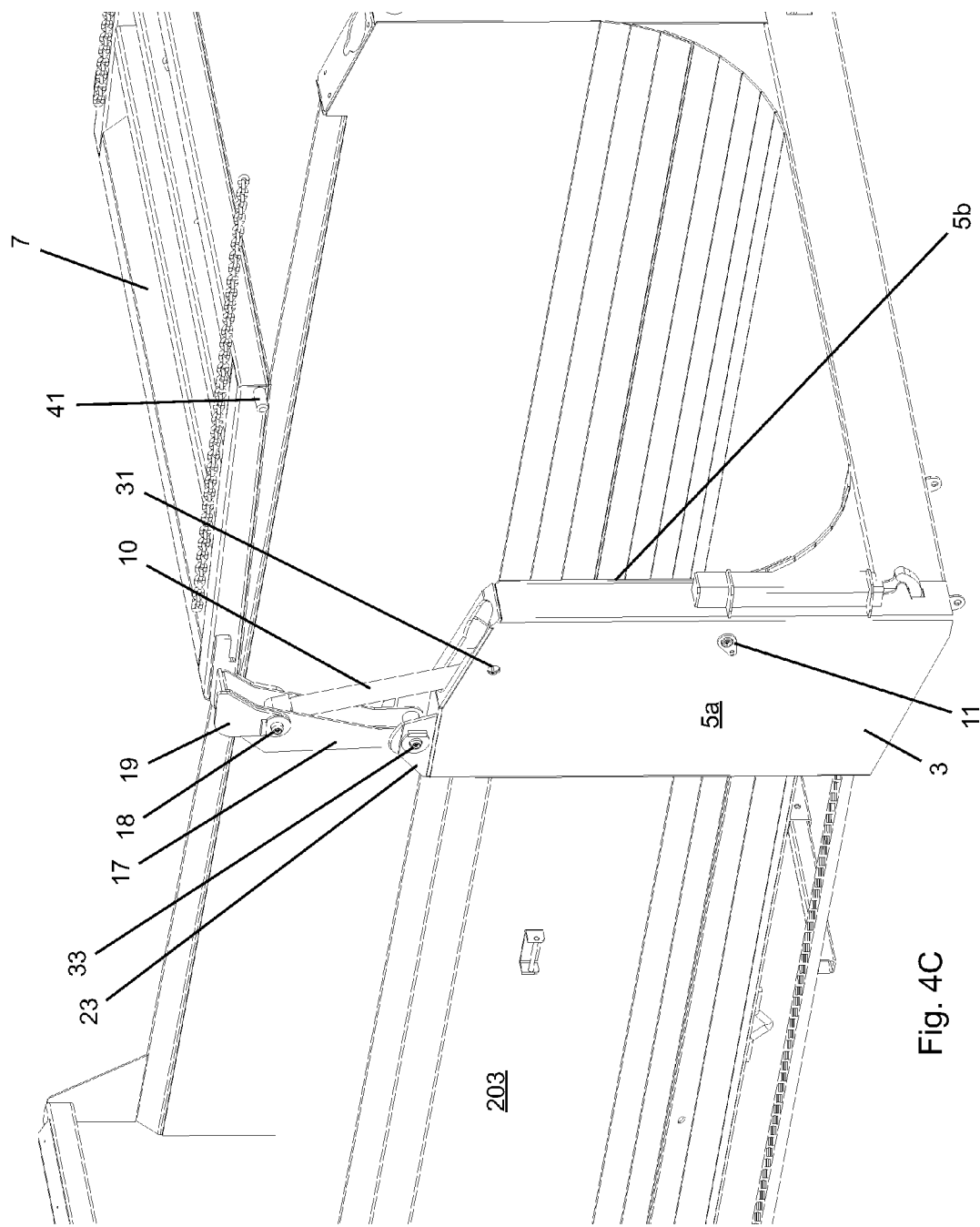
FIG. 4C is a three-dimensional view of the embodiment of the tailgate illustrated in FIG. 4B.

As indicated above, when selector pin 33 is installed in the first position within aperture 29 (e.g., manually by a vehicle or tailgate operator) such as shown in FIGS. 2A-2C, the tailgate is configured for so-called high lift operation. During such operation as illustrated in FIGS. 4A-4C, tailgate latch 51 has been opened or released (as described in further detail below) and rod 10 of cylinder 9 has been extended. When rod 10 is extended as such (by pressurization of cylinder 9), because the forward end of lever arm 13 is pivotally secured to bracket 23 (and tilting of cylinder 9 is unobstructed by selector pin 33), gate 7 lifts or raises upwardly and simultaneously angularly outwardly. In particular, by raising both upwardly and outwardly, a large opening is obtained at the rearward end of truck body 203 which allows large and/or irregularly shaped loads or objects to be dumped from the dump body more easily and with less chance of damage to the tailgate.

Although the present invention is not intended to be limited to the specific lever configurations illustrated or by the relative location (e.g., with respect to vertical or horizontal spacing) of the illustrated parts one to the other, the illustrated configuration, inclusive of its relative parts arrangements and locations, has proven to be particularly efficacious in tailgate operation. In this regard, and referring now to FIG. 8, a particularly advantageous configuration is obtained when the horizontal distance between the terminal end of the lever arm and the connection of the lever arm to the second end of the extendible and retractable cylinder, when the tailgate is in a non-open position, is selected to be approximately 15.250 inches (other dimensions may, of course, be selected). This dimension has proven particularly effective when combined with the pictured vertical spacing distance between the terminal end of the lever arm and the connection of the lever arm to the second end of the extendible and retractable cylinder of approximately 3.123 inches (other dimensions may, of course, be selected). In particular, by arranging the parts of the tailgate as such (using the pictured lever configurations and dimensions, etc.), when the tailgate is setup for high lift mode, the tailgate lifts away from the dump body soon after lift cylinder extension begins (e.g., substantially immediately, in at least one embodiment). As at least one advantage, by lifting the tailgate quickly away from the dump body upon cylinder extension, "hang up" of the tail gate on portions of the dump body is reduced and/or prevented.

Metering or Slide Lift Operation

When selector pin 33 is removed from the first position within aperture 29 (e.g., manually by a vehicle or tailgate operator) and, instead, installed in the second position within aperture 31 such as shown in FIGS. 5A-5B, the tailgate is setup for so-called metering or slider (or slide) lift operation. During such operation as illustrated in FIGS. 6A-6F, tailgate latch 51 has been opened or released (however, in this mode, latch 51 can employ such a hook 53 configuration such that release of the hook is not necessary for gate metering) and rod 10 of cylinder 9 has once again been extended. When rod 10 is extended in this mode, rather than gate 7 being lifted outwardly such as in the high lift mode, gate 7 raises vertically upward without changing its angular orientation with respect to the truck body (e.g., in a straight line vertically upwards). Conversely, when rod 10 is retracted, gate 7 will be descend in a straight vertical line downward towards and into engagement or proximal to engagement with latch 51. Of course, by pressurizing or depressurizing cylinder 9 in select increments, the vertical height of gate 7 can be intentionally selected to obtain one or more sized dump openings, as desired, at the rear of the vehicle dump body. Being able to select different sized openings, in this regard, is typically useful for controlling the flow of material from a dump body. Control of flow may be important for various reasons including if such material is being fed into a spreader, such as a salt or aggregate spreader or for distributing materials in an even thickness over a large area, for example.

Top Hinge (or Top Pivot) Mode

Figure 3B:
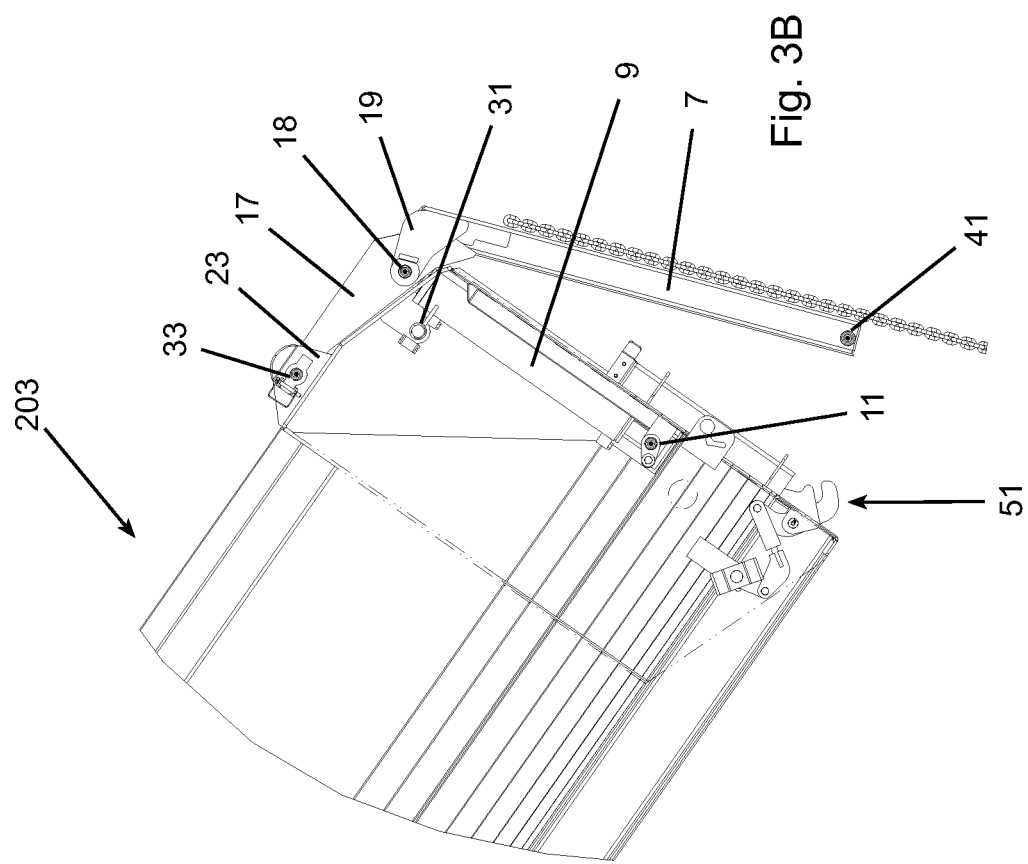
FIG. 3B is a profile, x-ray view of the embodiment of the tailgate illustrated in FIG. 3A.

The herein described tailgates are additionally advantageous in that, in at least some embodiments, regardless of the install position of selector pin 33, tailgate 1 can be operated in a top hinge (or pivot) mode. In this regard, a top hinge (or pivot) mode is a mode in which gate 7 can pivot outwardly away from truck body 203 (via gravity) when the truck body is raised into a tilted or dump position. In order to obtain this functionality in preferred (but non-limiting) embodiments (such as those illustrated), there is a pivot type connection of gate 7 to forward arm 17 via pivot pin 18 (with rear arm 19 being non-pivotally connected to the gate). Moreover, a configuration of forward and rear arms 17 and 19 has been selected such that despite the arms being nested when assembled together, free pivoting of gate 7 with respect to the truck body is possible by simple operation of gravity when the truck body is raised or tilted. That is, when the truck body is raised or tilted into a dump position such as illustrated in FIGS. 3A-3B and 5C, regardless of the install position of selector pin 33, gate 7 is free—by operation of gravitational forces—to swing open and outwardly about pivot pin 18 (latch 51 must be unlatched, of course). Such a mode, for example, is conventionally useful for dumping free-flowing materials such as sand and gravel.

As can be ascertained from the above description, the (non-limiting) example tailgates illustrated and described herein are particularly advantageous in that they are structurally configured such that they can be selectively used in three different modes, as desired (e.g., based on materials being transported in a truck body). Such example configurations are particularly useful in that one truck (employing such a novel tailgate) can be used for carrying multiple types of loads or loads containing combinations of material types, and the functionality or mode of the tailgate can be changed by the vehicle operator, to accommodate such differing load types. For example, a truck employing such a tailgate could be used to transport sand which could then be dumped using the tailgate in a metering type (or slider type—such terms being used interchangeably herein) mode whereby the volume of sand being dumped (per unit of time) can be controlled by varying the vertical lift height of the tailgate (e.g., using controls in the cab of the truck). Afterwards, the same truck employing the same tailgate can be used to carry tree branches or boulders and the like. When transporting such large, bulky load types, in order to dump them, the vehicle operator need only switch the tailgate to a high lift mode, for example (and then perform a dump operation, again using controls within the cab of the truck).

Figure 9A:
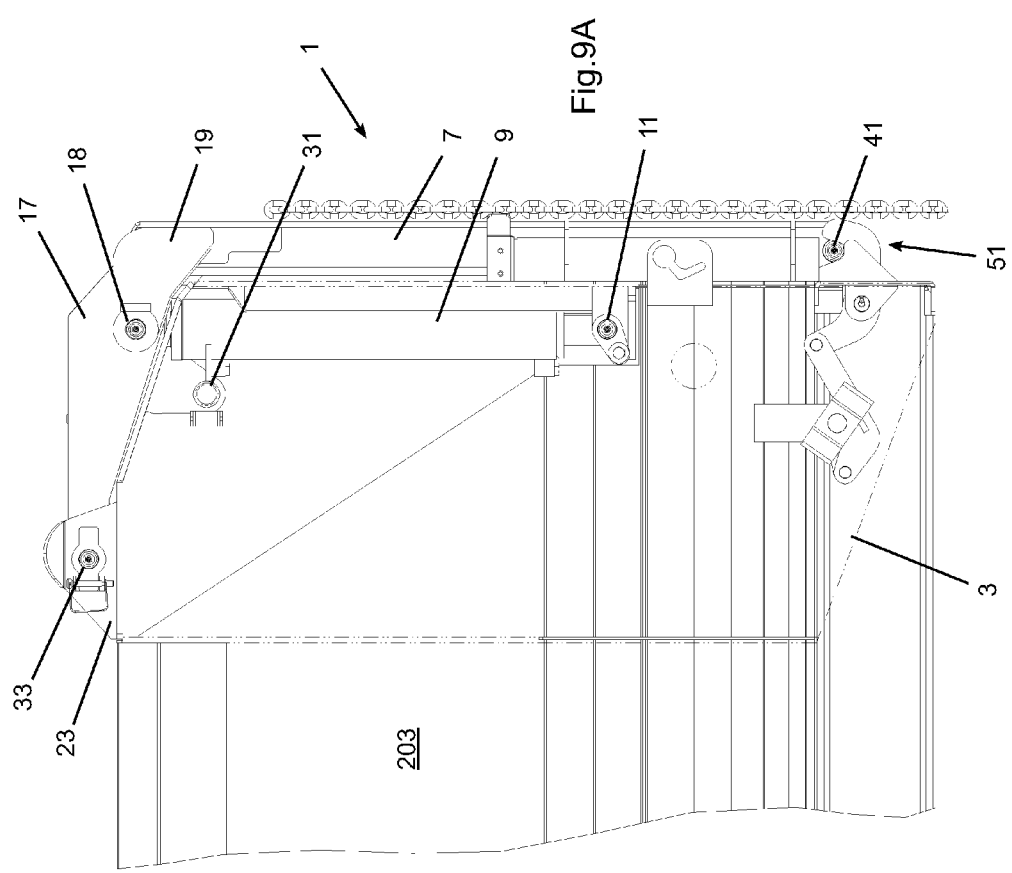
FIG. 9A illustrates a two-dimensional, x-ray view of an embodiment of a tailgate prior to the cylinder being extended.
Figure 9C:
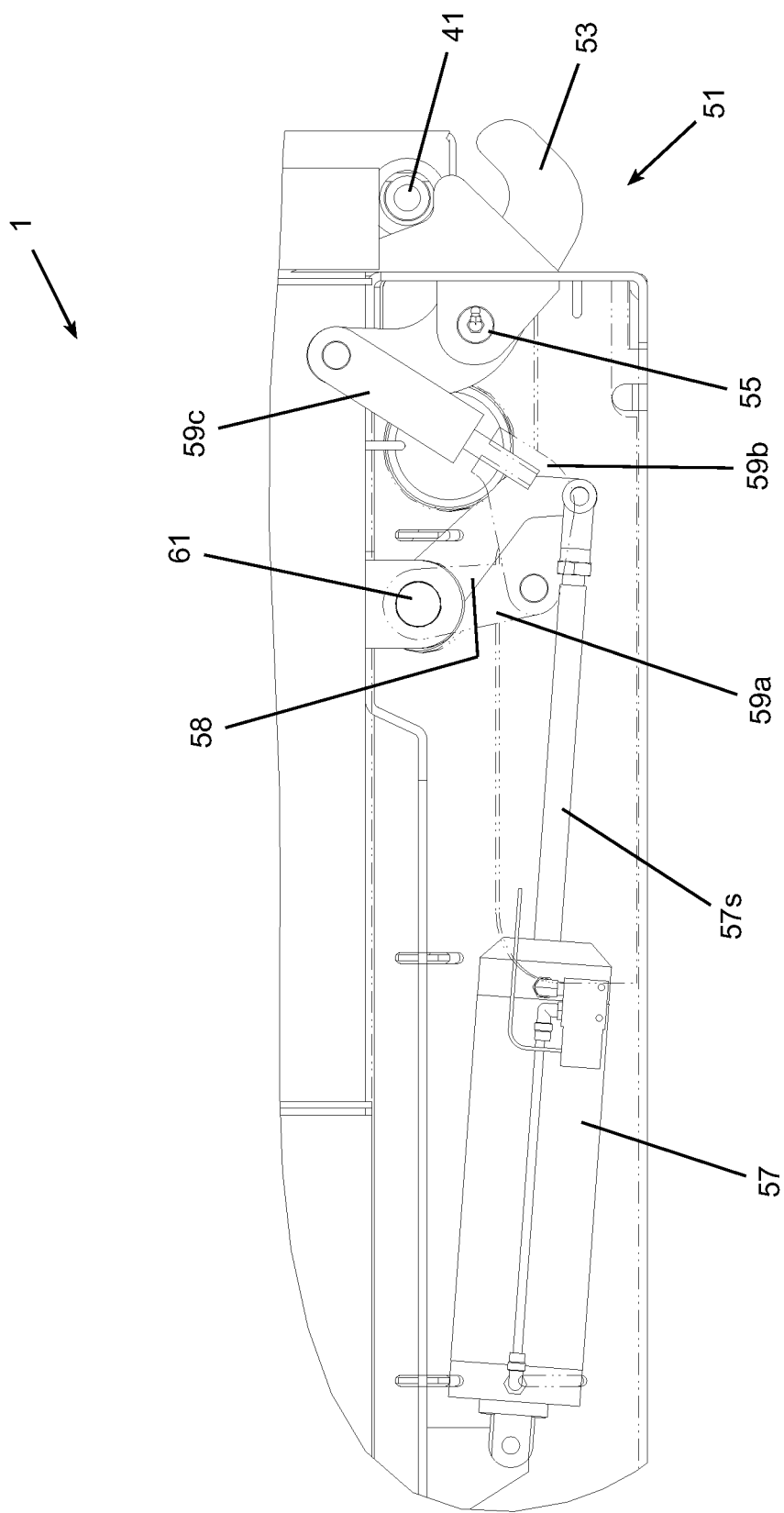
FIG. 9C illustrates a two-dimensional, x-ray view of one embodiment of a tailgate latch in an open, unlatched position.
Figure 9D:
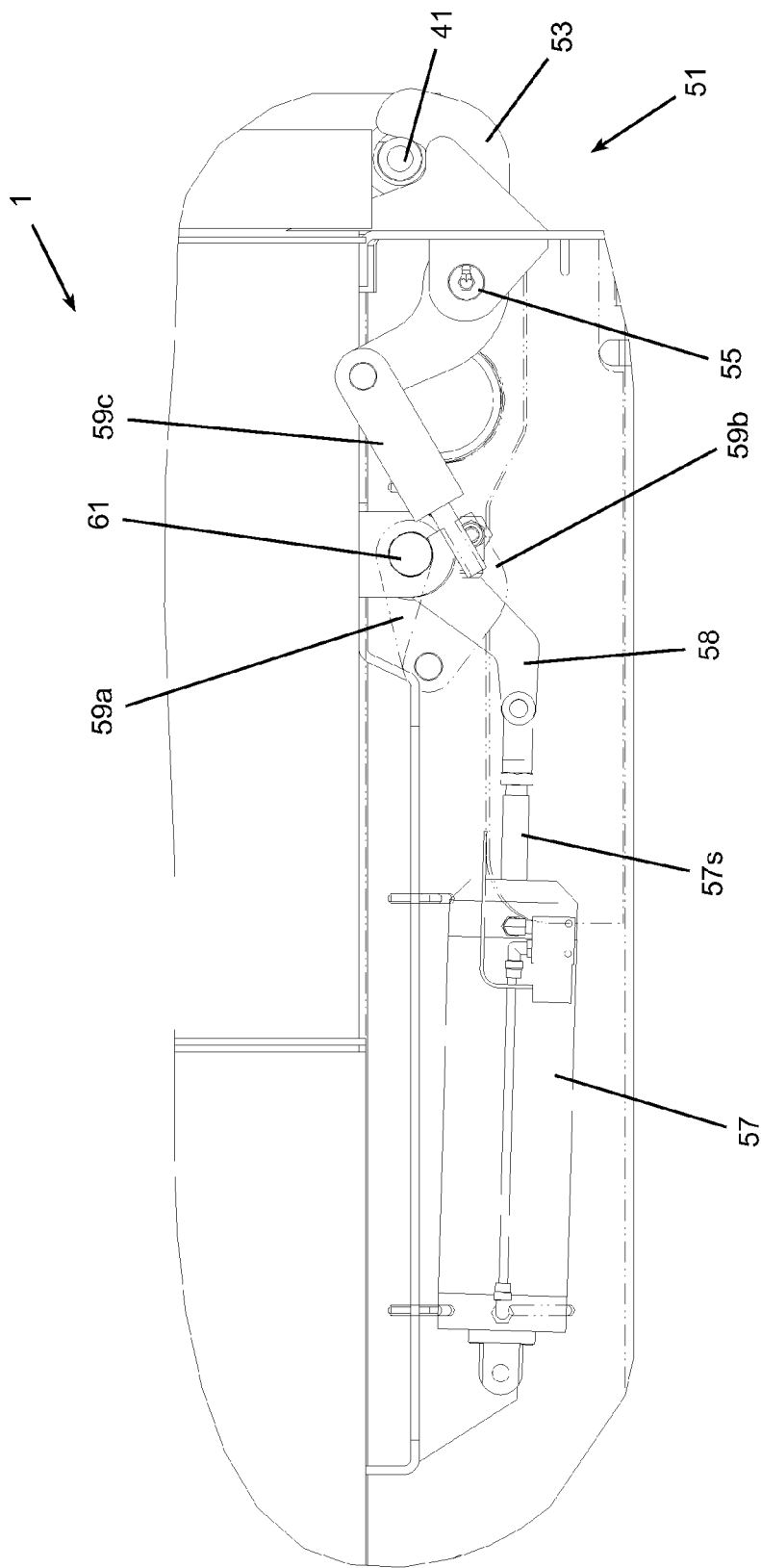
FIG. 9D illustrates a two-dimensional, x-ray view of one embodiment of a tailgate latch in a closed, latched position.

As briefly described in various sections above, at least some embodiments of the tailgates described herein benefit by employing a latch assembly 51 for allowing or prohibiting pivoting of the tailgate about top pivot 18 (e.g., by capturing or releasing a pin or pins located near the bottom of such a tailgate). Such a latch assembly, seen best in FIGS. 9A-9D, may be manually operated or may be controlled via electronic, pneumatic, or hydraulic mechanisms or any combination thereof (either by using controls or even simple levers located inside or outside of the truck cab). For example, as illustrated in the non-limiting embodiment depicted in FIGS. 9A-9D, the particular latch embodiment shown therein is operated by an air cylinder or actuator 57 which has an extendible and retractable portion or shaft 57s connected to an actuator arm 58. This arm, in this example embodiment, is, in turn, connected to a cross-shaft 61. When actuator arm 58 is rotated (by extension or retraction of shaft 57s) such as shown in FIGS. 9C and 9D, cross-shaft 61 is cause to rotate which, in turn, causes linkage 59a—connected to shaft 61—to rotate. Then, depending on the direction of operation of actuator 57, hook 53 is caused to latch or unlatch as against pin 41, via the interconnection of intermediate linkages 59b and 59c, each pivotally connected one to the other. Although the illustrated embodiment of a latch works particularly well with the subject invention, other latch types and/or configurations may, of course, be employed.

Referring now finally specifically to FIGS. 7A-7D, detailed, exploded views of various parts can be seen as can more detail with respect to parts such as pivot pin 18 and selector pin 33. For example, although the illustrated configurations are not required to practice within the scope of the subject invention, the head of pivot pin 18 includes a pin collar 39 with at least one flat or linear surface or edge 39s for abutting a stop 41 located on rear arm 19 (e.g., to prevent rotation of pin 18). Similarly, the head of selector pin 33 includes a collar 37 having one or more extensions which can be optionally utilized to prevent undesired rotation of the pin. In the non-limiting example illustrated, a u-shaped bracket is welded proximal to each of apertures 29 and 31 and itself contains apertures for receipt of a locking pin 35. Using such an arrangement, selector pin 33 can be installed so that the extension of collar 37 nests with u-bracket 43 and is secured in place with locking pin 35.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

I claim:

1. A tailgate comprising:
   a pair of spaced apart side walls;
   an end wall comprising a gate;
   at least one extendible and retractable actuator pivotally connected at a first end to one of said spaced apart side walls;
   a lever arm having a first elongated arm portion including a terminal end and said lever arm having a second arm bracket portion pivotally connected to said first elongated arm portion via a pivot which simultaneously connects said extendible and retractable actuator to said lever arm; said gate being connected to and extending downwardly from said second arm bracket portion;
   at least first and second apertures located in said one of said spaced apart side walls, said first and second apertures being located in particular positions of said tailgate such that:
   a) when a selector pin is inserted in said first aperture, said extendible and retractable actuator is secured in a substantially or completely vertical orientation during extension and retraction and, therefore, when said actuator is operated to extend or retract when said selector pin is inserted in said first aperture, said extendible and retractable actuator thereby raises or lowers said gate up or down, respectively, within a generally vertical plane in a metering mode;
   b) when said selector pin is inserted in said second aperture, said selector pin connects said terminal end of said lever arm to, or proximal to, said one of said spaced apart side walls at a location such that when said extendible and retractable actuator is extended, said lever arm pivots about an axis of said selector pin and said extendible and retractable actuator pivots about its said first end within a range of angles such that said gate is raised upwardly and angularly outwardly in a high lift mode; and
   wherein said first and said second apertures are so located, and said gate is pivotable via said pivot connection of said second arm bracket portion to said first elongated arm portion, such that said gate is operable in a top hinge mode regardless of said selector pin location.

2. The tailgate according to claim 1 wherein when said selector pin is installed in said first aperture, said tailgate can be switched between top pivot an metering modes using only controls in an interior compartment of a vehicle.

3. The tailgate according to claim 2 wherein when said selector pin is installed in said second aperture, said tailgate can be switched between top pivot and high lift modes using only controls in the interior compartment of a vehicle.

4. The tailgate according to claim 1 further including a latch assembly structurally configured such that it is capable of being operated to selectively allow or prohibit pivoting of said gate about said pivot.

5. The tailgate according to claim 4 wherein said gate includes a catch and wherein said latch assembly comprises at least a hook which can be selectively operated to capture or release said catch to secure said gate against pivotable movement or allow said gate to pivot, respectively.

6. The tailgate according to claim 4 wherein said extendible and retractable actuator is a mechanism selected from the group consisting of: a hydraulic cylinder, a pneumatic cylinder, and an electrically operated actuator.

7. The tailgate according to claim 6 wherein, when said tailgate is in a non-open position, there is a horizontal distance between said terminal end of said lever arm and said pivot connection of said lever arm to said extendible and retractable actuator and there is a vertical spacing distance between said terminal end of the lever arm and said pivot connection of said lever arm to said extendible and retractable actuator.

* * * * *